(12) United States Patent
Takahashi

(10) Patent No.: US 9,569,084 B2
(45) Date of Patent: Feb. 14, 2017

(54) ELECTRONIC DEVICE, METHOD OF CONTROLLING DISPLAY, AND PROGRAM

(75) Inventor: Shinji Takahashi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 275 days.

(21) Appl. No.: 13/807,176

(22) PCT Filed: May 20, 2011

(86) PCT No.: PCT/JP2011/002821
§ 371 (c)(1),
(2), (4) Date: Dec. 27, 2012

(87) PCT Pub. No.: WO2012/001872
PCT Pub. Date: Jan. 5, 2012

(65) Prior Publication Data
US 2013/0104074 A1    Apr. 25, 2013

(30) Foreign Application Priority Data
Jul. 1, 2010    (JP) .................................. 2010-151204

(51) Int. Cl.
G06F 3/0485    (2013.01)
G06F 3/0488    (2013.01)

(52) U.S. Cl.
CPC .......... *G06F 3/0485* (2013.01); *G06F 3/0488* (2013.01); *G06F 3/04855* (2013.01); *G06F 2203/04808* (2013.01)

(58) Field of Classification Search
USPC ........................................................ 715/784
See application file for complete search history.

(56) References Cited

U.S. PATENT DOCUMENTS 5,844,547 A    12/1998    Minakuchi et al.
5,847,709 A *  12/1998    Card et al. ................... 715/850
(Continued)

FOREIGN PATENT DOCUMENTS

JP    10-161628 A    6/1998
JP    2827612 B2    11/1998
(Continued)

OTHER PUBLICATIONS

Flick Definition—Luke Wroblewski—Apr. 2010.*
(Continued)

*Primary Examiner* — Weilun Lo
*Assistant Examiner* — David S Posigian
(74) *Attorney, Agent, or Firm* — Seed IP Law Group LLP

(57) ABSTRACT

An electronic device includes a display section that displays an object; a touch panel that detects a touch input manipulation; a touch determination section that determines a type and a direction of the touch input manipulation performed on the object; and a scroll control unit that performs a first inertial scroll of the object in a direction of flicking manipulation when the touch determination section determines that that flicking manipulation is performed on the object without performing slide manipulation on the object, and a second inertial scroll of the object that is longer in scroll distance and faster in scroll speed than the first inertial scroll when the touch determination section determines that slide manipulation is performed on the object and then the flicking manipulation is performed on the object in a direction opposite to the direction of the slide manipulation.

14 Claims, 24 Drawing Sheets

(56) References Cited

U.S. PATENT DOCUMENTS

| | | | |
|---|---|---|---|
| 7,345,675 B1 | 3/2008 | Minakuchi et al. | |
| 2004/0046795 A1* | 3/2004 | Josephson | G06F 3/011 715/764 |
| 2004/0100479 A1 | 5/2004 | Nakano et al. | |
| 2004/0109013 A1* | 6/2004 | Goertz | 345/702 |
| 2006/0250358 A1* | 11/2006 | Wroblewski | 345/157 |
| 2008/0036743 A1* | 2/2008 | Westerman et al. | 345/173 |
| 2008/0231610 A1* | 9/2008 | Hotelling et al. | 345/173 |
| 2009/0077488 A1* | 3/2009 | Ording | 715/784 |
| 2009/0153288 A1* | 6/2009 | Hope et al. | 340/3.1 |
| 2009/0278806 A1* | 11/2009 | Duarte | G06F 3/0416 345/173 |
| 2010/0125786 A1* | 5/2010 | Ozawa | G06F 3/04845 715/702 |
| 2010/0194706 A1* | 8/2010 | Watanabe et al. | 345/173 |
| 2010/0214237 A1* | 8/2010 | Echeverri | G06F 3/04883 345/173 |
| 2010/0283742 A1* | 11/2010 | Lam | G06F 3/04883 345/173 |
| 2011/0055753 A1* | 3/2011 | Horodezky | G06F 3/04883 715/810 |
| 2011/0072388 A1* | 3/2011 | Merrell | G06F 3/0485 715/784 |
| 2011/0090255 A1* | 4/2011 | Wilson et al. | 345/647 |
| 2013/0111396 A1* | 5/2013 | Brid | 715/784 |

FOREIGN PATENT DOCUMENTS

| | | |
|---|---|---|
| JP | 2003-330613 A | 11/2003 |
| JP | 3593827 B2 | 11/2004 |
| JP | 2010-124181 A | 6/2010 |

OTHER PUBLICATIONS

Jörg Geißler. 1998. Shuffle, throw or take it! working efficiently with an interactive wall. In CHI 98 Cconference Summary on Human Factors in Computing Systems (CHI '98). ACM, New York, NY, USA, 265-266. DOI=http://dx.doi.org/10.1145/286498.286745.*

Dzimitry Aliakseyeu, Pourang Irani, Andrés Lucero, and Sriram Subramanian. 2008. Multi-flick: an evaluation of flick-based scrolling techniques for pen interfaces. In Proceedings of the SIGCHI Conference on Human Factors in Computing Systems (CHI '08). ACM, New York, NY, USA, 1689-1698. DOI=http://dx.doi.org/10.1145/1357054.1357319.*

Adrian Reetz, Carl Gutwin, Tadeusz Stach, Miguel Nacenta, and Sriram Subramanian. 2006. Superflick: a natural and efficient technique for long-distance object placement on digital tables. In Proceedings of Graphics Interface 2006 (GI '06). Canadian Information Processing Society, Toronto, Ont., Canada, Canada, 163-170.*

International Search Report, mailed Aug. 30, 2011, for International Application No. PCT/JP2011/002821, 2 pages.

* cited by examiner

FIG. 4
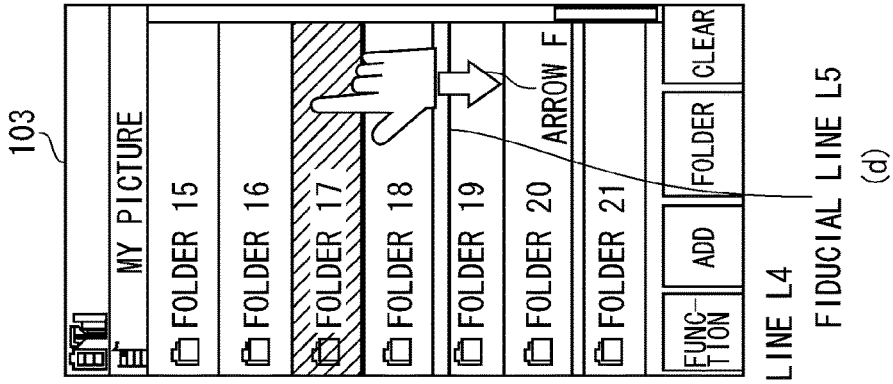
(d)
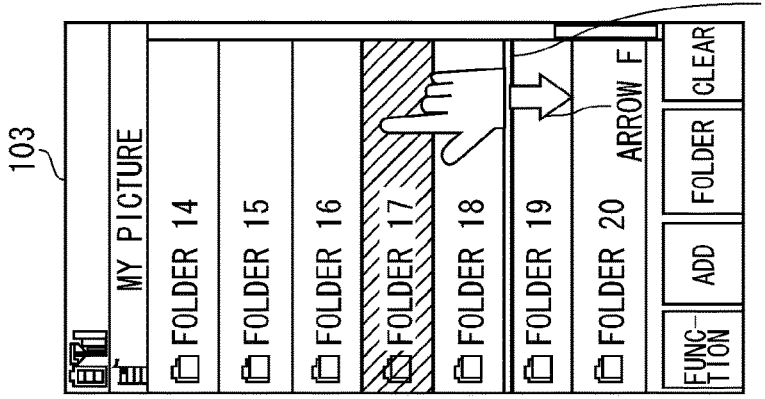
(c)
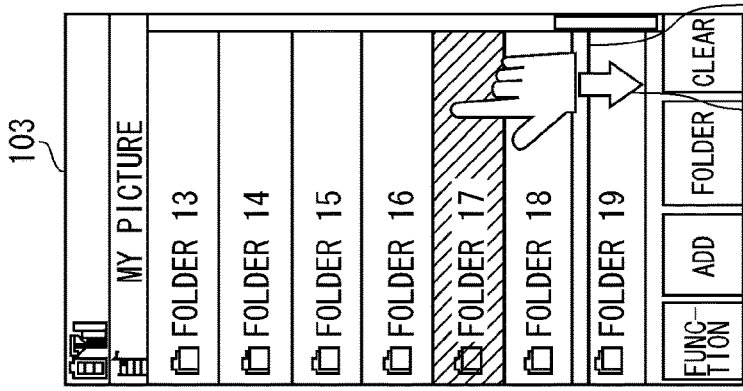
(b)
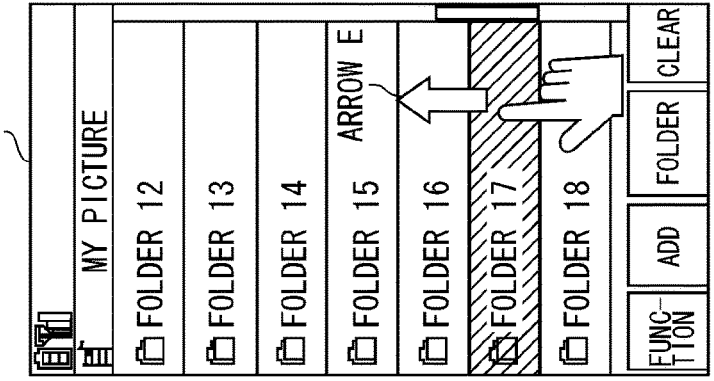
(a)

ELECTRONIC DEVICE, METHOD OF CONTROLLING DISPLAY, AND PROGRAM

TECHNICAL FIELD

The present invention relates to an electronic device having a touch panel as input means, a method of controlling a display, and a program.

BACKGROUND ART

Electronic devices having touch panels as input means are prevalent. Screen scroll control is performed in these electronic devices.

Patent Literature 1 includes the following descriptions. When touch determination means has determined that a touch input whose shift speed or shift amount is in excess of a predetermined given value has been made in one certain direction on an object which is registered as exhibiting a virtual continuous extent outside a display screen, display control means provides a scroll display of the object in the direction while taking the shift speed of the touch input as initial speed. Patent Literature 1 also includes descriptions stating that, when the touch determination means detects completion of a touch input, the display control means performs display control to thereby slow scroll speed of the scroll display to a stop.

Patent Literature 2 includes descriptions about control that is carried out to take, as a displacement scroll state, a period during which coordinates are input by way of coordinate input means and switch the state to an inertial scroll state when the inputting of coordinates entered by way of the coordinate input means has stopped. In the displacement scroll state, control is performed in such a way that a display screen is scrolled along a vector which is equal to a vector of a change in input coordinates. In the meantime, in the inertial scroll state, control is performed so as to scroll a display screen along a vector proportional to a vector of changes in input coordinates achieved right before cessation of inputting of coordinates and decrease the scroll speed of the display screen decreases with a lapse of time.

CITATION LIST

Patent Literature

Patent Literature 1; Japanese Patent No. 2827612
Patent Literature 2; Japanese Patent No. 3593827

SUMMARY OF INVENTION

Technical Problem

However, in relation to an object registered as exhibiting a virtual continuous extent outside the display screen, when a position of the object desired to be displayed is distant from the display screen, existing inertial scroll manipulation requires that the display screen must be scrolled by repeating scroll manipulation or performing flicking manipulation many a time without interruption after the inertial scroll is performed once. The display control method described in connection with Patent Literature 1 must wait for temporary completion of the inertial scroll. Under the display control method defined in connection with Patent Literature 2, scroll manipulation must be iterated many a time. The operation, therefore, will become cumbersome for the user.

An object of the present invention is to provide an electronic device, a method of controlling a display, and a program that enable an object on a display to shift to a predetermined position at high speed by means of sliding manipulation and flicking manipulation without repeated scroll manipulation.

Solution to Problem

An aspect of the present invention provides an electronic device, including; a display section that displays an object; a touch panel that detects a touch input manipulation; a touch determination section that determines a type of the touch input manipulation performed on the object and a direction of the touch input manipulation based on the touch input manipulation detected by the touch panel and display information about the object displayed on the display section; and a scroll control unit that performs; a first inertial scroll of the object in a direction of flicking manipulation when the touch determination section determines that that flicking manipulation which is one of the touch input manipulation is performed on the object without performing slide manipulation which is one of the touch input manipulation on the object; and a second inertial scroll of the object that is longer in scroll distance and faster in scroll speed than the first inertial scroll when the touch determination section determines that slide manipulation which is one of the touch input manipulation is performed on the object and then the flicking manipulation is performed on the object in a direction opposite to the direction of the slide manipulation.

The electronic device is configured by including a storage for temporarily storing the display information about the object, wherein the display section displays the object temporarily stored in the storage.

In the electronic device, the touch determination section determines a shift distance of the object caused by the touch input manipulation in addition to a determination of the type of the touch input manipulation, and the scroll control unit changes a distance or a speed of the second inertial scroll of the object depending on the shift distance of the object caused by the slide manipulation.

In the electronic device, the display section displays a first object to be a target of the touch input manipulation and a second object to be a fiducial for shifting the first object by means of the touch input manipulation, and the scroll control unit performs the first inertial scroll of the first object in a direction of the flicking manipulation when the touch determination section determines that the flicking manipulation is performed on the first object and performs the second inertial scroll of the first object in a direction of the flicking manipulation when the touch determination section determines that the slide manipulation is performed on the first object and then the flicking manipulation is performed on the first object so as to straddle the second object in a direction opposite to the direction of the slide manipulation.

In the electronic device, the touch determination section determines a shift distance of the object caused by the touch input manipulation in addition to a determination of the type of the touch input manipulation, and the scroll control unit changes a display of the second object and a distance or a speed of the second inertial scroll of the first object depending on the shift distance of the first object caused by the slide manipulation.

An aspect of the present invention provides an electronic device, including: a touch panel that detects a touch input manipulation; a display section that displays a first object to be a target of the touch input manipulation, a second object that is a fiducial for shifting the first object in one direction by means of the touch input manipulation, and a third object that is a fiducial for shifting the first object in another direction that crosses the one direction by means of the touch input manipulation; a touch determination section that determines a type and a direction of the touch input manipulation performed on the object based on the touch input manipulation detected by the touch panel and display information about the object which is displayed on the display section; a scroll control unit that performs a first inertial scroll of the first object in a second direction when the touch determination section determines that flicking manipulation is performed on the first object in the second direction which is opposite to a first direction without performing slide manipulation on the first object in the first direction, and performs a second inertial scroll of the first object which is longer in scroll distance or faster in scroll speed than the first inertial scroll in the second direction when the touch determination section determines that the slide manipulation is performed on the first object in the first direction and then the flicking manipulation is performed on the first object so as to straddle the second object in the second direction; and a jumping control unit that causes the first object to jump to a predetermined position in a fourth direction when the touch determination section determines that the slide manipulation is performed on the object in a third direction which crosses the first direction and then the flicking manipulation is performed on the first object so as to straddle the third object in the fourth direction which is opposite to the third direction.

In the electronic device, the touch determination section determines a shift distance of the first object caused by the touch input manipulation in addition to a determination of the type of the touch input manipulation, the scroll control unit changes a display of the second object and a distance of the second inertial scroll of the first object depending on the shift distance of the first object caused by the slide manipulation, and the jumping control unit changes a display of the third object and a jump distance of the first object depending on the shift distance of the first object caused by the slide manipulation.

An aspect of the present invention provides a method of controlling display, including the steps of: detecting a touch input manipulation by a touch panel; displaying an object on a display section; determining a type of the touch input manipulation performed on the object and a direction of the touch input manipulation based on the touch input manipulation detected by the touch panel and display information about the object displayed in the displaying step; performing a first inertial scroll of the object in a direction of flicking manipulation when it is determined in the determining step that that flicking manipulation which is one of the touch input manipulation is performed on the object without performing slide manipulation on the object; and performing a second inertial scroll of the object that is longer in scroll distance and faster in scroll speed than the first inertial scroll when it is determined in the determining step that slide manipulation is performed on the object and then the flicking manipulation is performed on the object in a direction opposite to the direction of the slide manipulation.

An aspect of the present invention provides a method of controlling display, including the steps of: detecting a touch input manipulation by a touch panel; displaying a first object to be a target of the touch input manipulation, a second object that is a fiducial for shifting the first object in one direction by means of the touch input manipulation, and a third object that is a fiducial for shifting the first object in another direction that crosses the one direction by means of the touch input manipulation; determining a type and a direction of the touch input manipulation performed on the object based on the touch input manipulation detected by the touch panel and display information about the object which is displayed in the displaying step; performing a first inertial scroll of the first object in a second direction when it is determined in the determining step that flicking manipulation is performed on the first object in the second direction which is opposite to a first direction without performing slide manipulation on the first object in the first direction; performing a second inertial scroll of the first object which is longer in scroll distance or faster in scroll speed than the first inertial scroll in the second direction when it is determined in determining step that the slide manipulation is performed on the first object in the first direction and then the flicking manipulation is performed on the first object so as to straddle the second object in the second direction; and causing the first object to jump to a predetermined position in a fourth direction when it is determined in the determining step that the slide manipulation is performed on the object in a third direction which crosses the first direction and then the flicking manipulation is performed on the first object so as to straddle the third object in the fourth direction which is opposite to the third direction.

An aspect of the present invention provides a program for causing a computer to execute the steps of: detecting a touch input manipulation by a touch panel; displaying an object on a display section; determining a type of the touch input manipulation performed on the object and a direction of the touch input manipulation based on the touch input manipulation detected by the touch panel and display information about the object displayed in the displaying step; performing a first inertial scroll of the object in a direction of flicking manipulation when it is determined in the determining step that that flicking manipulation which is one of the touch input manipulation is performed on the object without performing slide manipulation on the object; and performing a second inertial scroll of the object that is longer in scroll distance and faster in scroll speed than the first inertial scroll when it is determined in the determining step that slide manipulation is performed on the object and then the flicking manipulation is performed on the object in a direction opposite to the direction of the slide manipulation.

An aspect of the present invention provides a program for causing a computer to execute the steps of: detecting a touch input manipulation by a touch panel; displaying a first object to be a target of the touch input manipulation, a second object that is a fiducial for shifting the first object in one direction by means of the touch input manipulation, and a third object that is a fiducial for shifting the first object in another direction that crosses the one direction by means of the touch input manipulation; determining a type and a direction of the touch input manipulation performed on the object based on the touch input manipulation detected by the touch panel and display information about the object which is displayed in the displaying step; performing a first inertial scroll of the first object in a second direction when it is determined in the determining step that flicking manipulation is performed on the first object in the second direction which is opposite to a first direction without performing slide manipulation on the first object in the first direction; performing a second inertial scroll of the first object which is longer in scroll distance or faster in scroll speed than the first inertial scroll in the second direction when it is determined in determining step that the slide manipulation is performed on the first object in the first direction and then the flicking manipulation is performed on the first object so as to straddle the second object in the second direction; and causing the first object to jump to a predetermined position in a fourth direction when it is determined in the determining step that the slide manipulation is performed on the object in a third direction which crosses the first direction and then the flicking manipulation is performed on the first object so as to straddle the third object in the fourth direction which is opposite to the third direction.

Advantageous Effects of Invention

The electronic device, the method of controlling the display, and the program according to the present invention enable a high speed shift of an object on a display to a predetermined position without repeated scroll manipulation by means of sliding manipulation and flicking manipulation.

BRIEF DESCRIPTION OF DRAWINGS

In FIG. 4, (a) to (d) correspond to an example (1) of fiducial lines for flicking manipulation according to the first embodiment.

EMBODIMENTS FOR CARRYING OUT INVENTION

Embodiments of the invention are hereunder described by reference to the drawings.

First Embodiment

Figure 1:
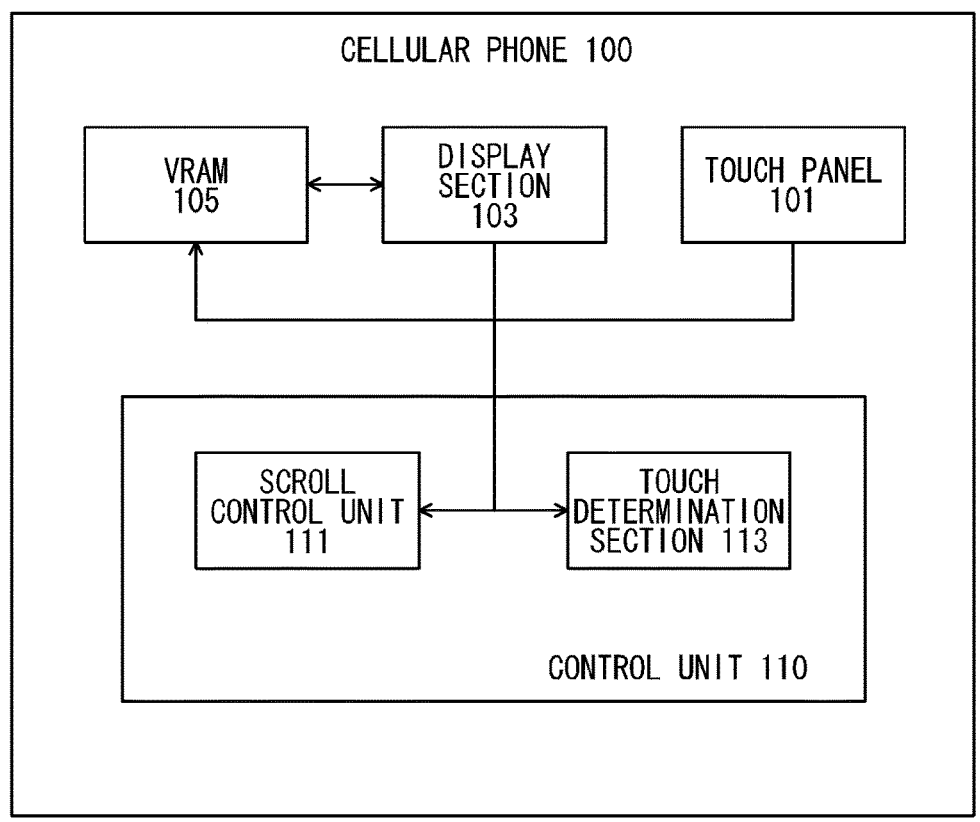
FIG. 1 is a block diagram showing a configuration of a cellular phone 100 according to a first embodiment.

A configuration of a cellular phone 100 is now described as an embodiment of an electronic device of the invention by reference to FIG. 1. FIG. 1 is a block diagram showing a configuration of the cellular phone 100. The cellular phone 100 shown in FIG. 1 has a touch panel 101, a display section 103, a storage 105, and a control unit 110. The control unit 110 has a scroll control unit 111 and a touch determination section 113.

The touch panel 101 detects, on a basis of coordinates allocated to a touch panel plane, a direction, a shift speed, and a shift amount of user's touch input manipulation, by means of a pressure sensor, and the like. Detection results are output to the touch determination section 113.

Various types of objects subjected to user's touch manipulation are displayed in the display section 103 of the touch panel 101. In relation to the objects to be displayed in the display section 103, positional information about display positions of the objects and information about physical attributes of the objects are temporarily stored, on the basis of the coordinates allocated to a touch panel plane, as "object information" in the storage 105. The storage 105 is made up of; for instance, VRAM (Video Random Access Memory).

The touch determination section 113 makes a reference to the object information. (Virtual) physical attribute information about an object can be displayed by subjecting the object to physical manipulation based on an attribute of the object. The virtual physical attributes include; for instance, a weight, hardness/softness, friction resistance, and attracting force (gravity), and others, of the object.

The cellular phone 100 according to the embodiment is configured so as to be able to liken the display section 103 to a real space, deem touch input manipulation detected by the touch panel 101 as if physical manipulation were performed on the object displayed in the display section 103, and display the object while imparting corresponding physical manipulation on the object.

By reference to FIGS. 2(a) to 2(d), an example of scroll manipulation of the display section 103 according to the embodiment is now described. FIGS. 2(a) to 2(d) are diagrams (1) for explaining scroll manipulation of the touch panel 101 according to the embodiment.

Figure 2:
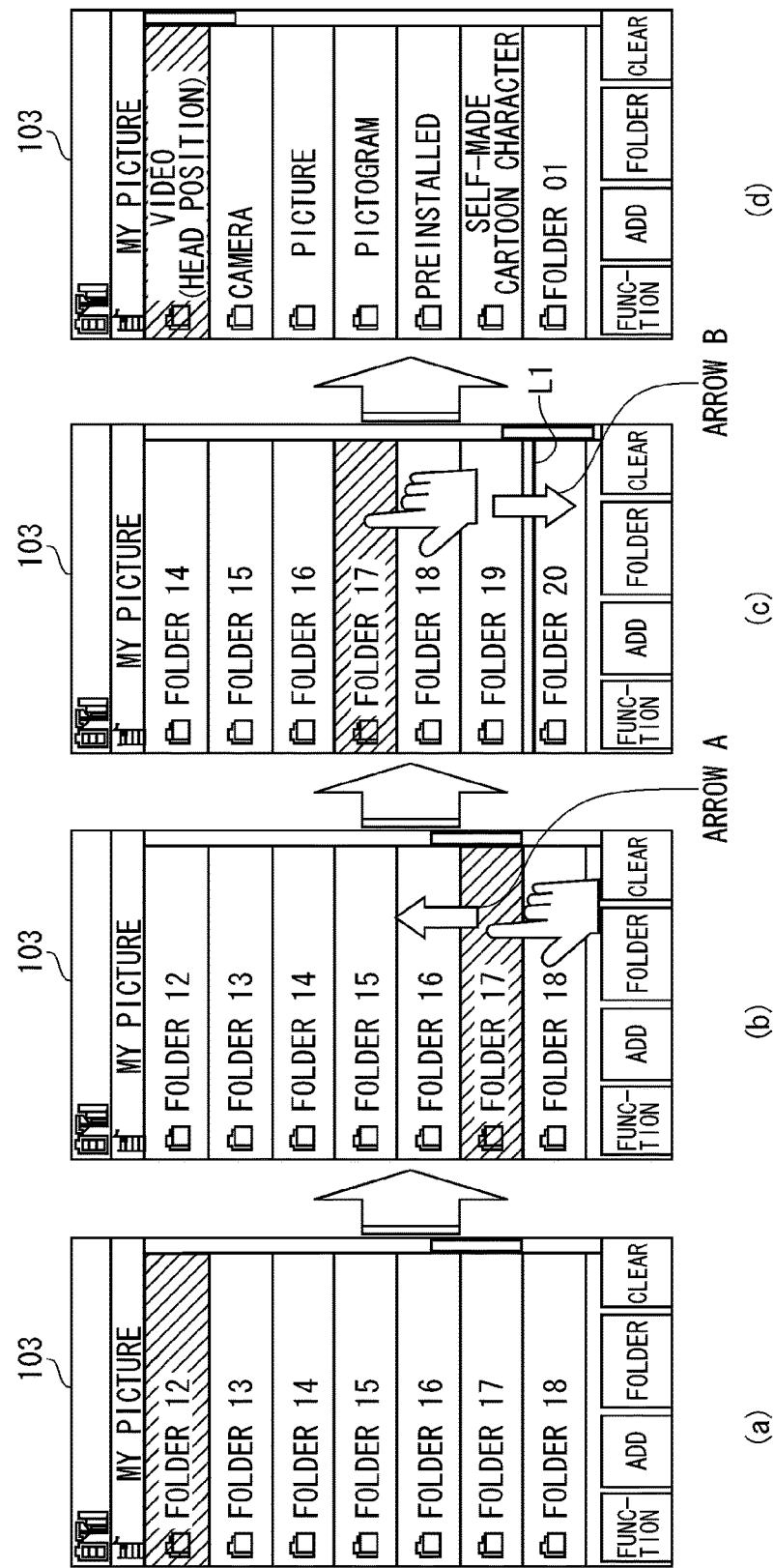
In FIG. 2, (a) to (d) are diagrams (1) for explaining scroll manipulation of a display section 103 according to the first embodiment.

Slide manipulation whose shift speed or shift amount exceeds a predetermined value is performed, in a direction designated by arrow A shown in FIG. 2(b), on a folder 17 selected from among folder objects of the display section 103 shown in FIG. 2(a) by means of user manipulation. As shown in FIG. 2(c), flicking manipulation that straddles a fiducial line L1 is performed, in a direction designated by arrow B (i.e., a direction opposite to an arrow A), on the folder object on the display section 103 shifted in the direction designated by arrow A by means of slide manipulation, thereby shifting the object on the display section 103 at high speed in the direction designated by arrow B (i.e., the direction opposite to the direction A) by means of an inertial scroll. As a result, as shown in FIG. 2(d), the folder object on the display section 103 can be shifted at high speed to a "Video Folder" at the head of the display section 103 by means of an inertial scroll. The folder object is an example of a first object. The fiducial line L1 belongs to the objects of the display section 103 and is an example of a second object.

Specifically, after slide manipulation whose shift speed or shift amount exceeds the predetermined value is performed on the object on the display section 103 in one direction, flicking manipulation whose shift amount exceeds the predetermined value is performed, in a direction opposite to the one direction, on the object on the display section 103 shifted in one direction by slide manipulation, whereby the object on the display section 103 is shifted at high speed to a predetermined position in the direction opposite to the one direction by means of an inertial scroll. Accordingly, the inertial scroll manipulation does not need to be iterated a number of times in order to shift the object on the display section 103 to the predetermined position. Therefore, the cellular phone 100 according to the embodiment obviates a necessity to iterate inertial scroll manipulation a number of times and can shift the object on the display section 103 to a predetermined position by means of only slide manipulation and flicking manipulation.

An inertial scroll referred to in the embodiment means the followings. On occasions when a change is performed on a display mode of the object on the display section 103 on the basis of a manipulation input to the touch panel 101, an object exhibiting a virtual continuous extent outside the display screen is scrolled in one certain direction on the display section 103 while taking a shift speed caused by the touch input manipulation as an initial rate, when it is detected that touch input manipulation whose shift speed or shift amount exceeds a predetermined value has been performed on the object in the certain direction.

In order to actualize the display mode, the touch determination section 113 determines a type and a direction of user's touch input manipulation and a shift amount according to a detection result output from the touch panel 101 and the object information referred to. Types of user's touch input manipulation include; for instance, slide manipulation and flicking manipulation. A direction of user's touch input manipulation is arbitrary on the touch panel. A determination result of the touch determination section 113 is output to the scroll control unit 111.

On the basis of the determination result made by the touch determination section 113, the scroll control unit 111 performs manipulation for changing the display mode, which is preset according to a type of touch input manipulation, with regard to the object, thereby carrying out display control of the display section 103. The manipulation for changing a preset display mode is display manipulation for performing virtual, physical manipulation with regard to the object corresponding to the touch input.

On the basis of a physical attribute of the object and a result of a determination made by the touch determination section 113 as to a type of touch input manipulation, the scroll control unit 111 recognizes how physical manipulation is performed on the object and controls the display section 103.

In accordance with display control of the scroll control unit 111, the display section 103 displays an object corresponding to a type of user's touch input manipulation.

By reference to FIGS. 3(a) to 3(f), an example of scroll manipulation of the display section 103 according to the embodiment is now described. FIG. 3(a) to FIG. 3(f) are diagrams (2) for explaining scroll manipulation of the display section 103 on the touch panel 101 according to the embodiment.

As shown in FIG. 3(a), slide manipulation whose shift speed or shift amount exceeds a predetermined value is performed, in a direction designated by arrow C, on a folder object "Folder 17" of the display section 103 selected by user's touch manipulation performed on the touch panel 101. As shown in FIG. 3(b), when a start position of slide manipulation is taken as a fiducial, a fiducial line L2 representing a fiducial amount of flicking manipulation is displayed at a position on the display section 103 that is on the other side with reference to a direction in which a movement has been made by slide manipulation (i.e., an upward direction). The fiducial line L2 is also one of the objects of the display section 103.

As shown in FIG. 3(c), flicking manipulation that straddles the fiducial line L2 is performed in direction designated by arrow D (i.e., a direction opposite to the direction designated by arrow C) with regard to the selected "Folder 17." As a result, as shown in FIG. 3(d), the folder object on the display section 103 can be shifted, by means of an inertial scroll, at high speed to a position of a folder object "Video Object" at a head of the display section 103. In contrast, when flicking manipulation that does not straddle the fiducial line L2 is performed on the selected folder object "Folder 17" in the direction designated by arrow D, an inertial scroll originating from flicking manipulation is carried out. More specifically, the folder object on the display section 103 does not shift up to the position of the folder object "Video Object" at the head of the display section 103 but, instead, is shifted over a distance corresponding to an amount of inertial scroll caused by the flicking manipulation. Put another way, the amount of scroll shift induced by the flicking manipulation that straddles the fiducial line is greater than an amount of scroll shift caused by flicking manipulation that does not straddle the fiducial line. Incidentally, in lieu of increasing the amount of scroll shift, the scroll speed induced by the flicking manipulation that straddles the fiducial line can also be made higher than the scroll speed induced by the flicking manipulation that does not straddle the fiducial line (the same also applies to any counterparts in the followings unless otherwise specified). Further alternatively, when compared with the flicking manipulation that does not straddle the fiducial line, the flicking manipulation that straddles the fiducial line can also be made greater in terms of both scroll speed and the amount of scroll shift rather than in terms of only the amount of scroll shift.

When the user has performed touch manipulation for releasing a finger from the selected folder object "Folder 17" as shown in FIG. 3(e), the folder object on the display section 103 makes a slide shift of the "Folder 17" from the selected position to a position where the finger has been released as shown in FIG. 3(f).

By dint of the slide manipulation and the flicking manipulation described by reference to FIG. 3(a) to FIG. 3(d), the cellular phone 100 according to the embodiment can make a high speed scroll shift of the object on the display section 103 to a predetermined position by means of only the slide manipulation and the flicking manipulation without repeated scroll manipulation. In particular, when a display range of the display section 103 is narrower than an object that exhibits a virtual continuous extent outside the display screen as in the case of the cellular phone 100, the slide manipulation and the flicking manipulation described by reference to FIG. 3(a) to FIG. 3(d) are effective.

Further, in the cellular phone 100 according to the embodiment, a fiducial line that serves as a fiducial for flicking manipulation is displayed in the display section 103. Accordingly, distinguishing between high speed inertial scroll of the object on the display section 103 to a predetermined position and ordinary inertial scroll manipulation can be made by means of flicking manipulation that straddles the fiducial line and flicking manipulation that does not straddle the fiducial line.

By reference to FIG. 4(a) to FIG. 6(d), the fiducial line for flicking manipulation in the cellular phone 100 according to the embodiment is now described. FIG. 4(a) to FIG. 4(d) correspond to an example (1) of fiducial lines for flicking manipulation; FIG. 5(a) to FIG. 5(d) correspond to an example (2) of the fiducial lines for flicking manipulation; and FIG. 6(a) to FIG. 6(d) correspond to an example (3) of the fiducial lines for flicking manipulation.

By reference to FIG. 4(a) to FIG. 4(d), the example (1) of fiducial lines for flicking manipulation are described.

In FIG. 4(a), as in the case of FIG. 3(a), slide manipulation whose shift speed or shift amount exceeds a predetermined value in a direction designated by arrow E is carried out with regard to the object "Folder 17" of the display section 103 selected by the user's touch manipulation performed on the touch panel 101. A fiducial line depicting a reference amount of flicking manipulation appears in the display section 103. In FIG. 4(b) to FIG. 4(d), an amount of high speed inertial scroll shift achieved after flicking manipulation is changed on the basis of an amount of shift that originates from slide manipulation performed in a direction designated by arrow E shown in FIG. 4(a).

In FIG. 4(b), an amount of slide shift of the selected object "Folder 17" from a state shown in FIG. 4(a) in a direction designated by arrow E is small. In this case, a fiducial line L3 for flicking manipulation is displayed in; for instance, green in the display section 103. Moreover, an amount of high speed inertial scroll shift in arrow F (i.e., a direction opposite to the direction designated by arrow E) that originates from flicking manipulation is also set to a small value.

In FIG. 4(d), an amount of slide shift of the selected object "Folder 17" in the direction designated by arrow E from the state shown in FIG. 4(a) is large. In this case, a fiducial line L5 for flicking manipulation is displayed in; for instance, red, in the display section 103. Moreover, an amount of high speed inertial scroll shift that originates from flicking manipulation in arrow F (i.e., a direction opposite to the direction designated by arrow E) is also set to a large value.

In FIG. 4(c), an amount of slide shift of the selected object "Folder 17" in the direction designated by arrow E from the state shown in FIG. 4(a) is intermediate between the shift amount achieved in the state shown in FIG. 4(b) and the shift amount achieved in the state shown in FIG. 4(d). In this case, a fiducial line L4 for flicking manipulation is displayed in; for instance, yellow. Moreover, an amount of high speed inertial scroll shift that originates from flicking manipulation in arrow F (i.e., a direction opposite to the direction designated by arrow E) is set to a middle value between the shift amount achieved in the state shown in FIG. 4(b) and the shift amount achieved in the state shown in FIG. 4(d).

As mentioned above, the cellular phone 100 according to the embodiment causes the display section 103 to display the fiducial lines L3 to L5 for flicking manipulation in different colors according to an amount of slide manipulation and controls an amount of high speed inertial scroll shift originating from flicking manipulation according to an amount of user's slide manipulation. The fiducial lines L3 to L5 are also examples of the objects of the display section 103. Moreover, the fiducial lines L3 to L5 are examples of the second object.

By reference to FIG. 5(a) to FIG. 5(d), the example (2) of fiducial lines for flicking manipulation are described.

In FIG. 5(a), as in the case of FIG. 3(a), slide manipulation whose shift speed or shift amount exceeds a predetermined value in a direction designated by arrow G is carried out with regard to the object "Folder 17" of the display section 103 selected by the user's touch manipulation performed on the touch panel 101. A fiducial line depicting a reference amount of flicking manipulation appears in the display section 103. In FIG. 5(b) to FIG. 5(d), an amount of high speed inertial scroll shift achieved after flicking manipulation is changed on the basis of an amount of shift that originates from slide manipulation performed in a direction designated by arrow G shown in FIG. 5(a).

In FIG. 5(b), an amount of slide shift of the selected object "Folder 17" from a state shown in FIG. 5(a) in the direction designated by arrow E is small. In this case, a fiducial line L6 for flicking manipulation is displayed in; for instance, a thin line, in the display section 103. Moreover, an amount of high speed inertial scroll shift in arrow H (i.e., a direction opposite to the direction designated by arrow G) that originates from flicking manipulation is also set to a small value.

In FIG. 5(d), an amount of slide shift of the selected object "Folder 17" in the direction designated by arrow E from the state shown in FIG. 5(a) is large. In this case, a fiducial line L8 for flicking manipulation is displayed in; for instance, a thick line, in the display section 103. Moreover, an amount of high speed inertial scroll shift that originates from flicking manipulation in arrow H (i.e., a direction opposite to the direction designated by arrow G) is also set to a large value.

In FIG. 5(c), an amount of slide shift of the selected object "Folder 17" in the direction designated by arrow E from the state shown in FIG. 5(a) is intermediate between the shift amount achieved in the state shown in FIG. 5(b) and the shift amount achieved in the state shown in FIG. 5(d). In this case, a fiducial line L7 for flicking manipulation is displayed in; for instance, thickness that is intermediate between the thickness of the fiducial line L6 and the thickness of the fiducial line L8. Moreover, an amount of high speed inertial scroll shift that originates from flicking manipulation in arrow H (i.e., a direction opposite to the direction designated by arrow G) is set to a middle value between the shift amount achieved in the state shown in FIG. 5(b) and the shift amount achieved in the state shown in FIG. 5(d).

As mentioned above, the cellular phone 100 according to the embodiment causes the display section 103 to display the fiducial lines L6 to L8 for flicking manipulation in different thicknesses according to an amount of slide manipulation and controls an amount of high speed inertial scroll shift originating from flicking manipulation according to an amount of user's slide manipulation. The fiducial lines L6 to L8 are also examples of the objects of the display section 103. Moreover, the fiducial lines L6 to L8 are examples of the second object.

By reference to FIG. 6(a) to FIG. 6(d), the example (3) of fiducial lines for flicking manipulation are described.

In FIG. 6(a), as in the case of FIG. 3(a), slide manipulation whose shift speed or shift amount exceeds a predetermined value in a direction designated by arrow J is carried out with regard to the object "Folder 17" of the display section 103 selected by the user's touch manipulation performed on the touch panel 101. A fiducial line depicting a reference amount of flicking manipulation appears in the display section 103. In FIG. 6(b) to FIG. 6(d), an amount of high speed inertial scroll shift achieved after flicking manipulation is changed on the basis of an amount of shift that originates from slide manipulation performed in a direction designated by arrow J shown in FIG. 6(a).

In FIG. 6(b), an amount of slide shift of the selected object "Folder 17" from a state shown in FIG. 6(a) in the direction designated by arrow E is small. In this case, a fiducial line L9 for flicking manipulation is displayed in; for instance, one line, in the display section 103. Moreover, an amount of high speed inertial scroll shift in arrow K (i.e., a direction opposite to the direction designated by arrow J) that originates from flicking manipulation is also set to a small value.

In FIG. 6(d), an amount of slide shift of the selected object "Folder 17" in the direction designated by arrow E from the state shown in FIG. 6(a) is large. In this case, a fiducial line L11 for flicking manipulation is displayed in; for instance, three lines, in the display section 103. Moreover, an amount of high speed inertial scroll shift that originates from flicking manipulation in arrow K (i.e., a direction opposite to the direction designated by arrow J) is also set to a large value.

In FIG. 6(c), an amount of slide shift of the selected object "Folder 17" in the direction designated by arrow E from the state shown in FIG. 6(a) is intermediate between the shift amount achieved in the state shown in FIG. 6(b) and the shift amount achieved in the state shown in FIG. 6(d). In this case, a fiducial line L10 for flicking manipulation is displayed in; for instance, two lines that are intermediate between the fiducial line L9 and the fiducial line L11. Moreover, an amount of high speed inertial scroll shift that originates from flicking manipulation in arrow K (i.e., a direction opposite to the direction designated by arrow J) is set to a middle value between the shift amount achieved in the state shown in FIG. 6(b) and the shift amount achieved in the state shown in FIG. 6(d).

As mentioned above, the cellular phone 100 according to the embodiment causes the display section 103 to display the fiducial lines L9 to L11 for flicking manipulation in different numbers according to an amount of slide manipulation and controls an amount of high speed scroll shift originating from flicking manipulation according to an amount of user's slide manipulation. The fiducial lines L9 to L11 are also examples of the objects of the display section 103. Moreover, the fiducial lines L9 to L11 are examples of the second object.

Figure 7:
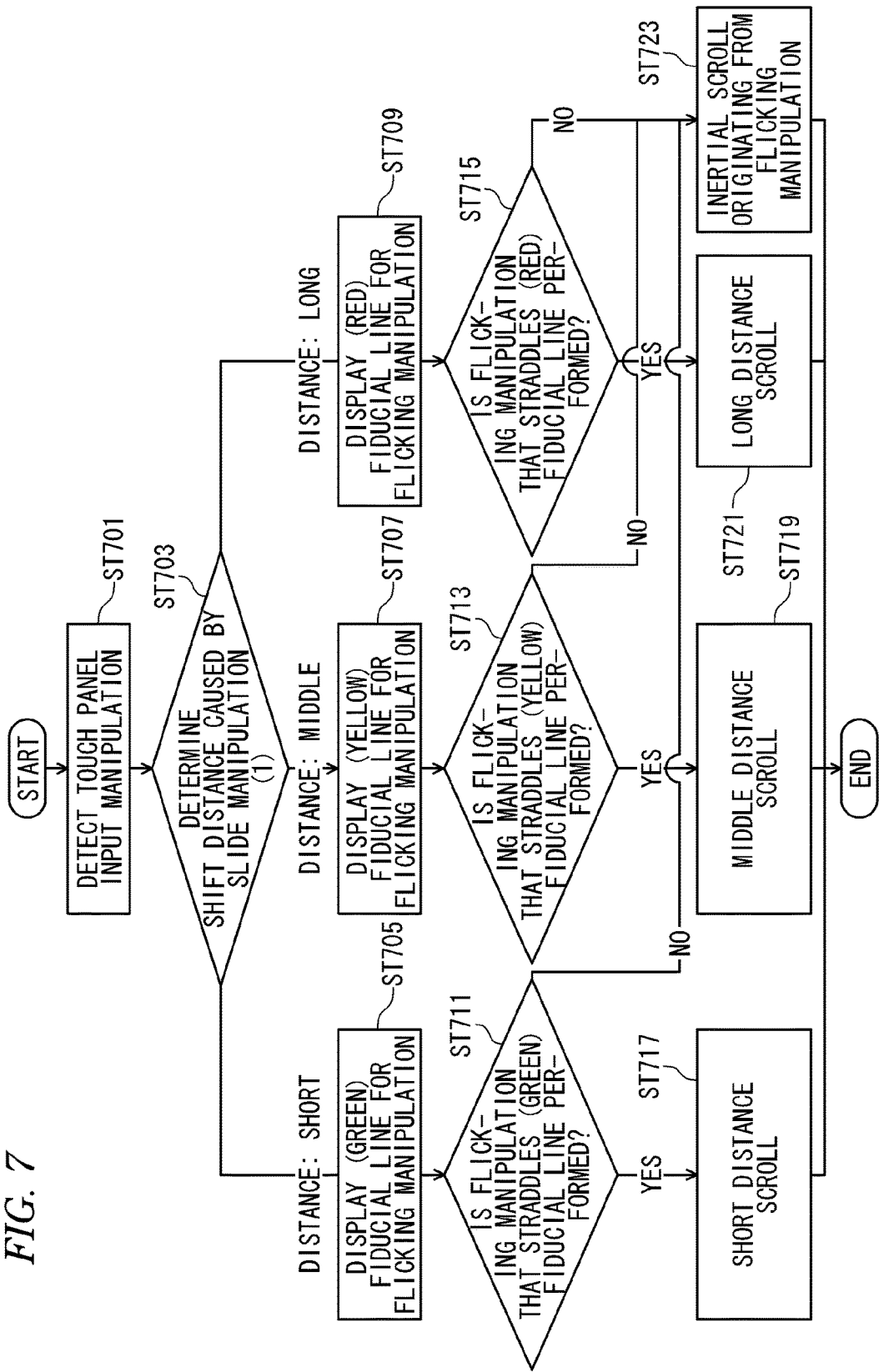
FIG. 7 is a diagram showing an operation flow of the cellular phone 100 with regard to high speed inertial scroll manipulation.

By reference to FIG. 7, there are described operation procedures pertaining to high speed inertial scroll manipulation for the cellular phone 100 according to the embodiment. FIG. 7 is a diagram showing an operation flow of the cellular phone 100 with regard to high speed inertial scroll manipulation.

In step ST701, the touch panel 101 detects user's touch panel input manipulation. Processing proceeds to step ST703.

In branch ST703, the touch determination section 113 determines, as user's touch panel input manipulation, slide manipulation, and a shift direction and a shift distance of the slide manipulation. When the user's touch panel input manipulation is slide manipulation and when a shift distance of the slide manipulation is short, processing proceeds to step ST705. When the user's touch panel input manipulation is slide manipulation and when a shift distance of the slide manipulation is intermediate, processing proceeds to step ST707. When the user's touch panel input manipulation is slide manipulation and when a shift distance of the slide manipulation is long, processing proceeds to step ST709.

In step ST705, the scroll control unit 111 displays a green line as a fiducial line for flicking manipulation in the display section 103. Processing then proceeds to step ST711. Incidentally, in step ST705, one line or a thin line can also be displayed as a fiducial line for flicking manipulation in the display section 103.

In step ST707, the scroll control unit 111 displays a yellow line as a fiducial line for flicking manipulation in the display section 103. Processing then proceeds to step ST713. Incidentally, in step ST707, two lines or a medium line can also be displayed as a fiducial line for flicking manipulation in the display section 103.

In step ST709, the scroll control unit 111 displays a red line as a fiducial line for flicking manipulation in the display section 103. Processing then proceeds to step ST715. Incidentally, in step ST709, three lines or a thick line can also be displayed as a fiducial line for flicking manipulation in the display section 103.

In branch ST711, the touch determination section 113 determines whether or not the flicking manipulation straddles the fiducial line (the green line). When the flicking manipulation straddles the fiducial line (the green line) (Yes), processing proceeds to step ST717. In contrast, when the flicking manipulation does not straddle the fiducial line (the green line) (No), processing proceeds to step ST723.

In branch ST713, the touch determination section 113 determines whether or not the flicking manipulation straddles the fiducial line (the yellow line). When the flicking manipulation straddles the fiducial line (the yellow line) (Yes), processing proceeds to step ST719. In contrast, when the flicking manipulation does not straddle the fiducial line (the yellow line) (No), processing proceeds to step ST723.

In branch ST715, the touch determination section 113 determines whether or not the flicking manipulation straddles the fiducial line (the red line). When the flicking manipulation straddles the fiducial line (the red line) (Yes), processing proceeds to step ST721. In contrast, when the flicking manipulation does not straddle the fiducial line (the red line) (No), processing proceeds to step ST723.

In step ST717, the scroll control unit 111 causes the display section 103 to perform a high speed scroll in a direction of flicking manipulation. In this case, a scroll shift distance is short (a short distance scroll) according to a (short) shift distance of slide manipulation. Processing flow pertaining to high speed scroll manipulation thus ends.

In step ST719, the scroll control unit 111 causes the display section 103 to perform a high speed scroll in the direction of flicking manipulation.

In this case, a scroll shift distance is middle (a middle distance scroll) according to a slide manipulation shift distance (middle). Processing flow pertaining to high speed scroll manipulation thus ends.

In step ST721, the scroll control unit 111 causes the display section 103 to perform a high speed scroll in the direction of flicking manipulation.

In this case, a scroll shift distance is long (a long distance scroll) according to a slide manipulation shift distance (long). Processing flow pertaining to high speed scroll manipulation thus ends.

In step ST723, since flicking manipulation does not straddle the fiducial line (the yellow line), the scroll control unit 111 causes the display section 103 to perform an inertial scroll that originates from flicking manipulation. Processing flow pertaining to high speed scroll manipulation thus ends.

Figure 3:
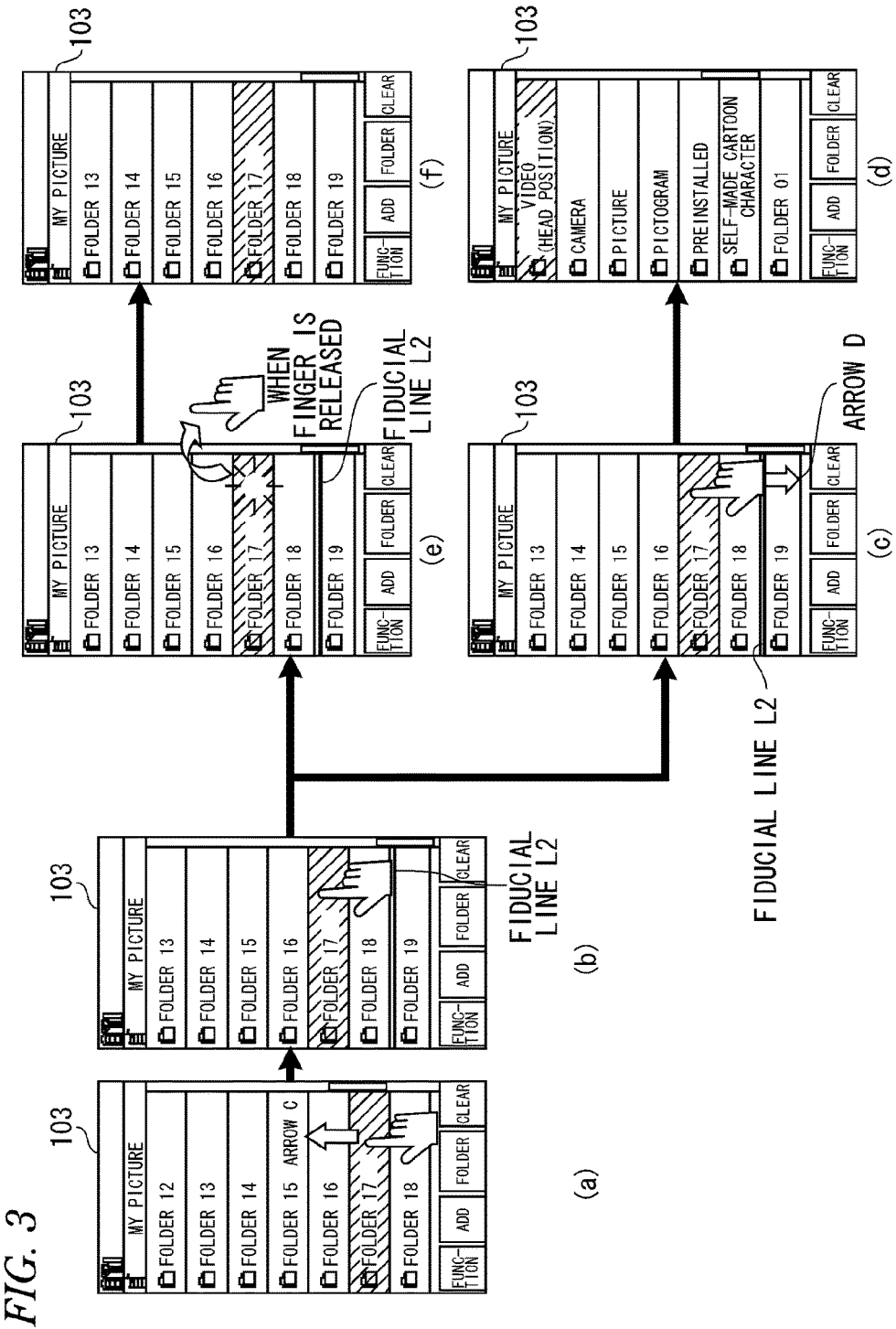
In FIG. 3, (a) to (f) are diagrams (2) for explaining scroll manipulation of the display section 103 according to the first embodiment.
Figure 5:
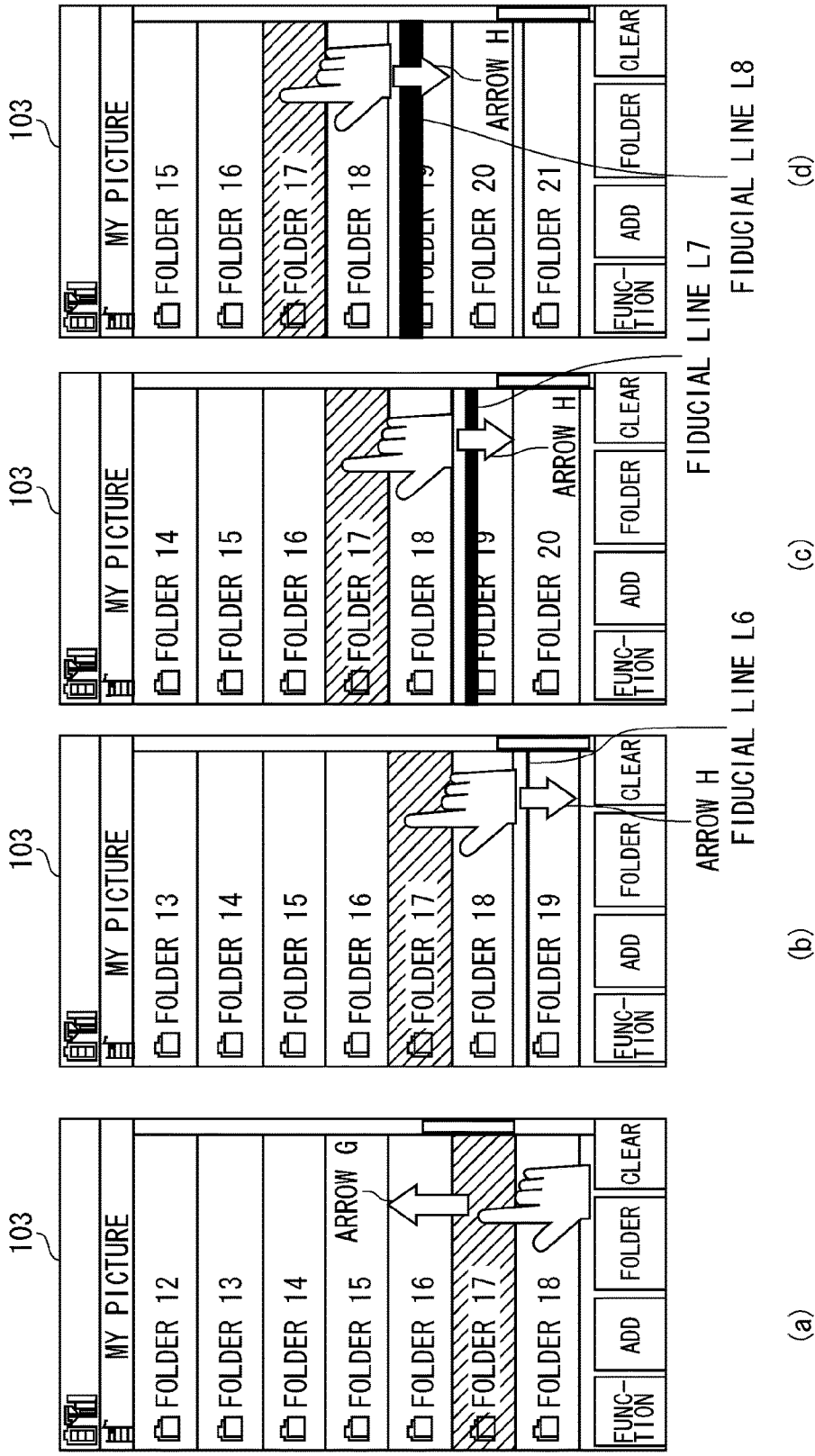
In FIG. 5, (a) to (d) correspond to an example (2) of the fiducial lines for flicking manipulation according to the first embodiment.
Figure 6:
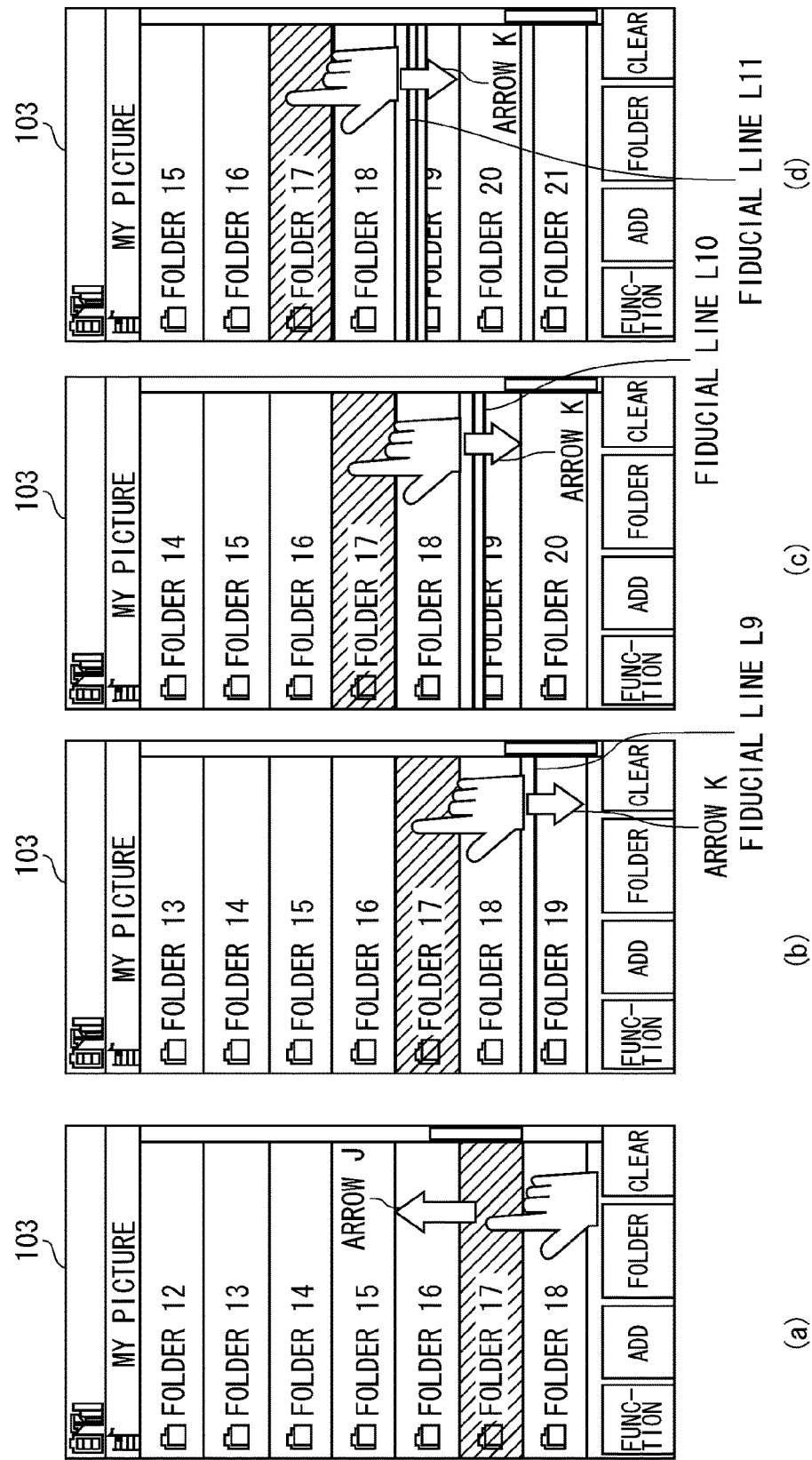
In FIG. 6, (a) to (d) correspond to an example (3) of the fiducial lines for flicking manipulation according to the first embodiment.

As above, the cellular phone 100 according to the embodiment makes it possible to perform high speed inertial scroll shift of the object on the display section 103 to a predetermined position without iteration of inertial scroll manipulation by means of the slide manipulation and the flicking manipulation described by reference to FIG. 3(*a*) to FIG. 3(*d*). In particular, when the display range of the display section 103 is narrower than the object that exhibits a virtual continuous extent outside the display screen as in the case of the cellular phone 100, the slide manipulation and the flicking manipulation described by reference to FIG. 3(*a*) to FIG. 3(*d*) are effective.

In the cellular phone 100 according to the embodiment, the fiducial line that serves as a fiducial for flicking manipulation is displayed on the display bock 103. Therefore, distinguishing between when the display section 103 is shifted at high speed to a predetermined position by an inertial scroll and when the display section 103 is shifted by means of ordinary inertial scroll manipulation can be carried out by means of flicking manipulation that straddles the fiducial line and flicking manipulation that does not straddle the fiducial line.

In the cellular phone 100 according to the embodiment, by changing the way to display the fiducial line for flicking manipulation according to the amount of slide manipulation, the user can control an amount of high speed inertial scroll shift originating from the flicking manipulation according to the amount of shift caused by slide manipulation.

Second Embodiment

In the first embodiment, high speed inertial scroll manipulation is brought into practice by means of slide manipulation and flicking manipulation that are performed on a folder object selected by means of user's touch manipulation. Effecting high speed inertial scroll manipulation is not confined to this way. In a cellular phone 300 according to a second embodiment that is another embodiment of the electronic device of the invention, an object on a display section 303 is jumped to a position of a marker (a bookmark) by making slide manipulation and flicking manipulation to a scroll bar 350 that is an object for scrolling an object on a display section 303. By means of the slide manipulation and the flicking manipulation performed on the scroll bar, the cellular phone 300 according to the second embodiment can shift any object on the display section 303 to a predetermined position without fail by means of a smaller amount of manipulation. Incidentally, the scroll bar 350 is an example of the first object.

Figure 8:
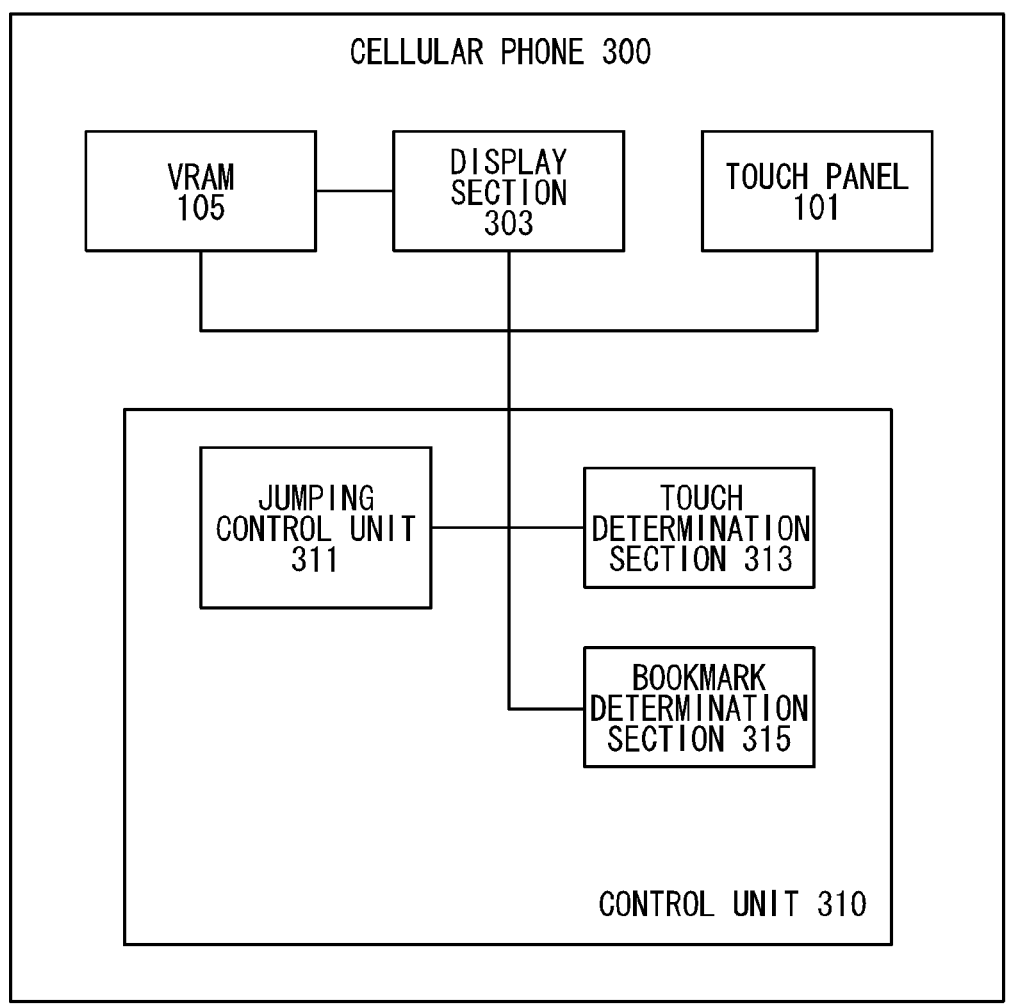
FIG. 8 is a block diagram showing a configuration of a cellular phone 300 according to a second embodiment.

FIG. 8 is a block diagram showing a configuration of the cellular phone 300 according to the second embodiment. The cellular phone 300 shown in FIG. 8 is provided with the touch panel 101, the display section 303, the storage 105, and a control unit 310. The control unit 310 has a jumping control unit 311, a touch determination section 313, and a bookmark determination section 315.

The touch panel 101 detects a direction, a shift speed, and a shift amount of user's touch input manipulation on the basis of coordinates allocated to a touch panel plane, by means of the pressure sensor, or the like. Detection results are output to the touch determination section 313.

Various objects to be subjected to user's touch manipulation are displayed in the display section 303 on the touch panel 101. In relation to various objects displayed in the display section 303, positional information about a display position of an object and information about physical attributes of the object are stored, on the basis of the coordinates allocated to the touch panel plane, as "object information" in the storage 105. The storage 105 is formed from; for instance, VRAM (Video Random Access Memory).

The touch determination section 313 makes a reference to the object information. Information about (virtual) physical attributes of the object can be displayed by making physical manipulation on the object on the basis of its attribute. Virtual physical attributes include; for instance, a weight, hardness/softness, friction resistance, and attracting force (gravity), and others, of the object.

The cellular phone 300 according to the embodiment is configured so as to be able to liken the display section 303 to a real space, deem touch input manipulation detected by the touch panel 101 as if physical manipulation were performed on the object displayed in the display section 303, and display the object while imparting corresponding physical manipulation on the object.

Figure 9:
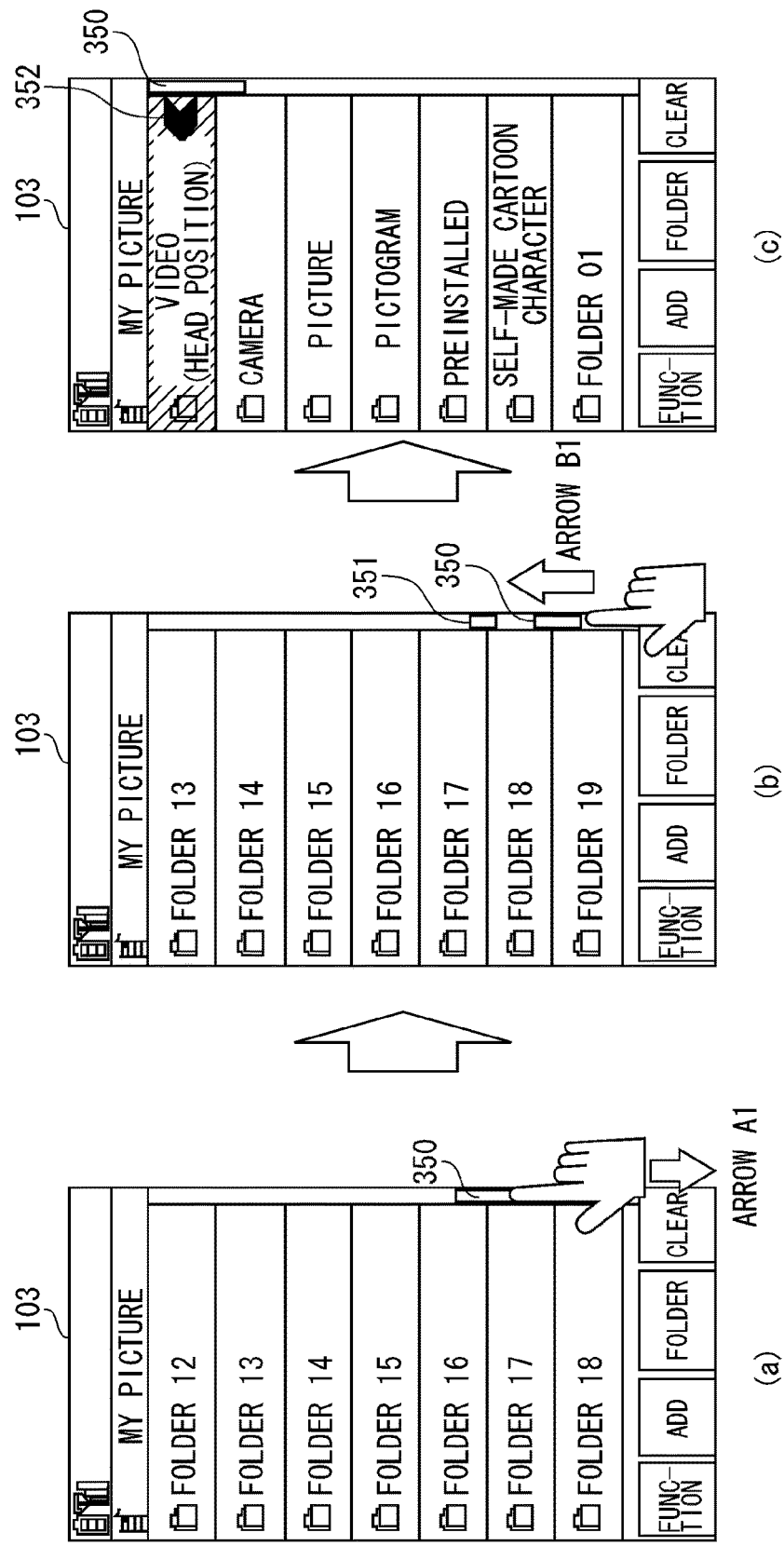
In FIG. 9, (a) to (c) are diagrams for explaining scroll manipulation of a display section 303 according to the second embodiment.

By reference to FIGS. 9(*a*) to 9(*c*), examples of scroll manipulation of the display section 303 according to the embodiment is now described. FIGS. 9(*a*) to 9(*c*) are diagrams (1) for explaining scroll manipulation of the display section 303 according to the embodiment.

As shown in FIG. 9(*a*), slide manipulation whose shift speed or shift amount exceeds a predetermined value is performed in a direction designated by arrow A1 with regard to the scroll bar 350 that is one of the objects of the display section 303. Flicking manipulation that straddles a fiducial bar 351 for flicking manipulation is performed in a direction designated by arrow B1 (a direction opposite to the arrow A1) as shown in FIG. 9(*b*), thereby shifting the scroll bar 350 at high speed by means of an inertial scroll. As a result, as shown in FIG. 9(*c*), a list of the folder objects of the display section 303 can be jumped to a "Video Object" where a bookmark 352 has been previously placed. When flicking manipulation that does not straddle the fiducial bar 351 is performed in a direction designated by arrow B1 (i.e., a direction opposite to the direction A1), an inertial scroll originating from the flicking manipulation is carried out. An amount of scroll shift originating from the flicking manipulation that straddles the fiducial bar 351 is greater than an amount of scroll shift originating from flicking manipulation that does not straddle the fiducial bar 351. Incidentally, the object where the bookmark is placed is not restricted to a head position of the list of the folder objects. The object where the bookmark is placed can be set to an arbitrary position in the folder objects (e.g., at a tail end of the folder objects). Alternatively, the bookmark 352 can also be hidden from view of the display section 303.

Specifically, slide manipulation whose shift speed or shift amount exceeds the predetermined value is performed on the scroll bar 350 of the display section 303 in one direction. Subsequently, flicking manipulation whose shift amount exceeds the predetermined value is performed on the scroll bar 350 in a direction opposite to the one direction, thereby shifting at high speed the list of folder objects of the display section 303 in a direction opposite to the one direction by means of an inertial scroll. As a result, the folder object on the display section 303 can be jumped to the head position of the display section 303 (i.e., "Video Folder Object"). A bookmark 352 is set in advance to the folder object situated at the top position.

The target to be subjected to slide manipulation and flicking manipulation in the first embodiment is the folder object in the first embodiment. Meanwhile, in the second embodiment, the target to be subjected to slide manipulation and flicking manipulation is the scroll bar 350 that shifts the list of folder objects. A shift direction of the scroll bar 350 and a shift direction of the list of the folder objects are opposite to each other. Accordingly, a direction of slide manipulation and flicking manipulation effected in the second embodiment is opposite to a direction of slide manipulation and flicking manipulation effected in the first embodiment.

An inertial scroll referred to in the embodiment means the followings. On occasions when a change is performed on a display mode of the object on the display section 303 on the touch panel 101 on the basis of a manipulation input to the touch panel 101, an object exhibiting a virtual continuous extent outside the display screen is scrolled in one certain direction on the display section 303 while taking shift speed caused by the touch input manipulation as an initial rate, when it is detected that touch input manipulation whose shift speed or shift amount exceeds a predetermined value has been performed on the object in the certain direction.

By means of the slide manipulation and the flicking manipulation described by reference to FIG. 9(*a*) to FIG. 9(*c*), the cellular phone 300 according to the embodiment can actualize high speed scroll manipulation. In particular, when a display range of the display section 303 is narrower than the object that exhibits a virtual continuous extent outside the display screen, as in the case of the cellular phone 300, the scroll manipulation is effective. Moreover, on the occasion of the slide manipulation and the flicking manipulation described by reference to FIG. 9(*a*) to FIG. 9(*c*), the fiducial bar 351 that serves as a fiducial for flicking manipulation appears in the display section 303 of the cellular phone 300 according to the embodiment. Accordingly, the cellular phone 300 enables the user to visually ascertain an index used for high speed scroll manipulation and carry out high speed scroll manipulation reliably. The fiducial bar 351 belongs to the objects of the display section 103 and is an example of the second object.

The touch panel 101 detects a direction, shift speed, and shift amount of user's touch input manipulation on the basis of the coordinates allocated to the touch panel plane, by means of the pressure sensor, or the like. A detection result is output to the touch determination section 313.

Various objects subjected to user's touch manipulation appear in the display section 303 on the touch panel 101. In relation to the various objects that appear in the display section 303, positional information about display positions of the objects and information about physical attributes of the objects are stored, as "object information" in the storage 105 on the basis of the coordinates allocated to the touch panel plane. The storage 105 is made up of; for instance, VRAM (Video Random Access Memory).

The touch determination section 313 makes a reference to object information. (Virtual) physical attribute information about an object can be displayed by subjecting the object to physical manipulation based on an attribute of the object. The virtual physical attributes include; for instance, a weight, hardness/softness, friction resistance, and attracting force (gravity), and others, of the object.

The cellular phone 300 according to the embodiment is configured so as to be able to liken the display section 303 to a real space, deem touch input manipulation detected by the touch panel 101 as if physical manipulation were performed on the object displayed in the display section 303, and display the object while imparting corresponding physical manipulation on the object.

In order to actualize the above-mentioned display mode, the touch determination section 313 determines; for instance, a type, direction, and shift distance of user's touch input manipulation, on the basis of a detection result output from the touch panel 101 and the object information to which a reference has been made. Types of user's touch input manipulation include; for instance, slide manipulation and flicking manipulation. A direction of user's touch input manipulation corresponds to an arbitrary direction on the touch panel. The determination result of the touch determination section 313 is output to the jumping control unit 311.

On the basis of the determination result pertaining to a type of user's touch input manipulation given by the touch determination section 113, the jumping control unit 311 performs, in relation to the object, manipulation for changing a predetermined display mode corresponding to a type of user's touch input manipulation, thereby controlling a display of the display section 303. Manipulation for changing a predetermined display mode is display manipulation for making virtual jump manipulation to an object corresponding to a touch input.

On the basis of the physical attribute of the object and the determination result pertaining to the type of user's touch input manipulation made by the touch determination section 113, the jumping control unit 311 recognizes what physical manipulation has been performed on the object and controls the display section 303 so as to carry out; for instance, inertial scrolling of the object.

Moreover, the jumping control unit 311 has a jump function of jumping the display section 303 to a position of a bookmark on the basis of a determination result of the bookmark determination section 315 to be described later. On/off switching of the jump function can be actualized by means of initial settings of the cellular phone 300 or use's manipulation.

When the slide manipulation and the flicking manipulation are performed on the scroll bar 350 described by reference to FIG. 9(*a*) to FIG. 9(*c*) and when the object on the display section 303 is one (e.g., a list of folder objects) registered as exhibiting a virtual continuous extent outside the display screen, the bookmark determination section 315 determines whether or not a mark (bookmark), which represents a destination employed when the jump function is used, exists in a predetermined position of the object.

Moreover, the bookmark determination section 315 also determines the number of bookmarks in the object registered as the object that is on the display section 303 and that exhibits a virtual continuous extent outside the display screen.

A determination result of the bookmark determination section 315 is output to the jumping control unit 311. A position of a mark (a bookmark) representing a destination of the object employed when the jump function is used is set on the basis of; for instance, a distance from a position (the furthermost position, the nearest position, a middle position therebetween, and others) appearing on the display section 303 according to a shift distance of slide manipulation.

Under display control of the jumping control unit 311, the display section 303 displays an object conforming to the type of user's touch input manipulation.

Figure 10:
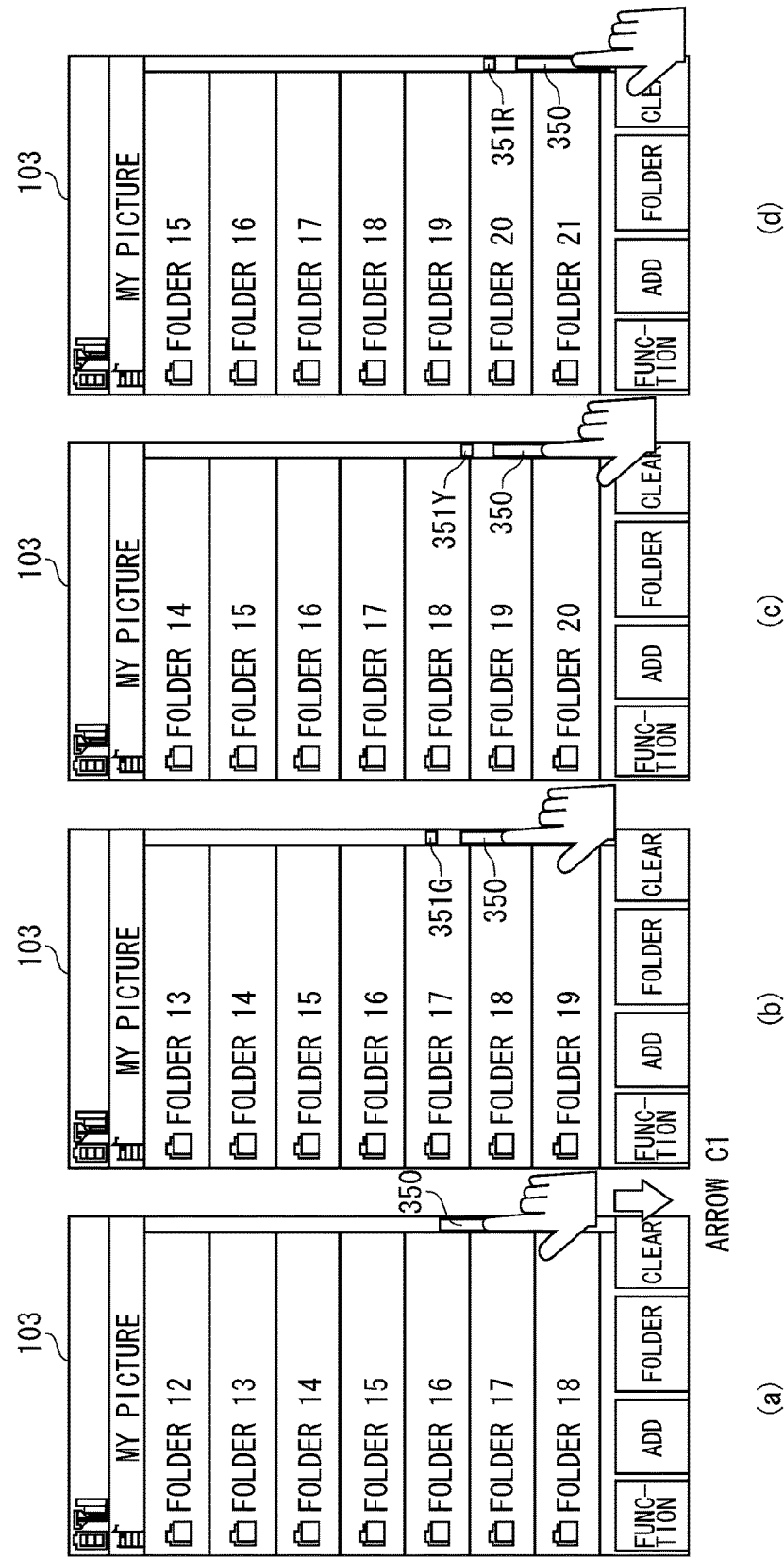
In FIG. 10, (a) to (d) are diagrams for explaining exemplary modification (1) of a fiducial bar 351 for flicking manipulation.
Figure 11:
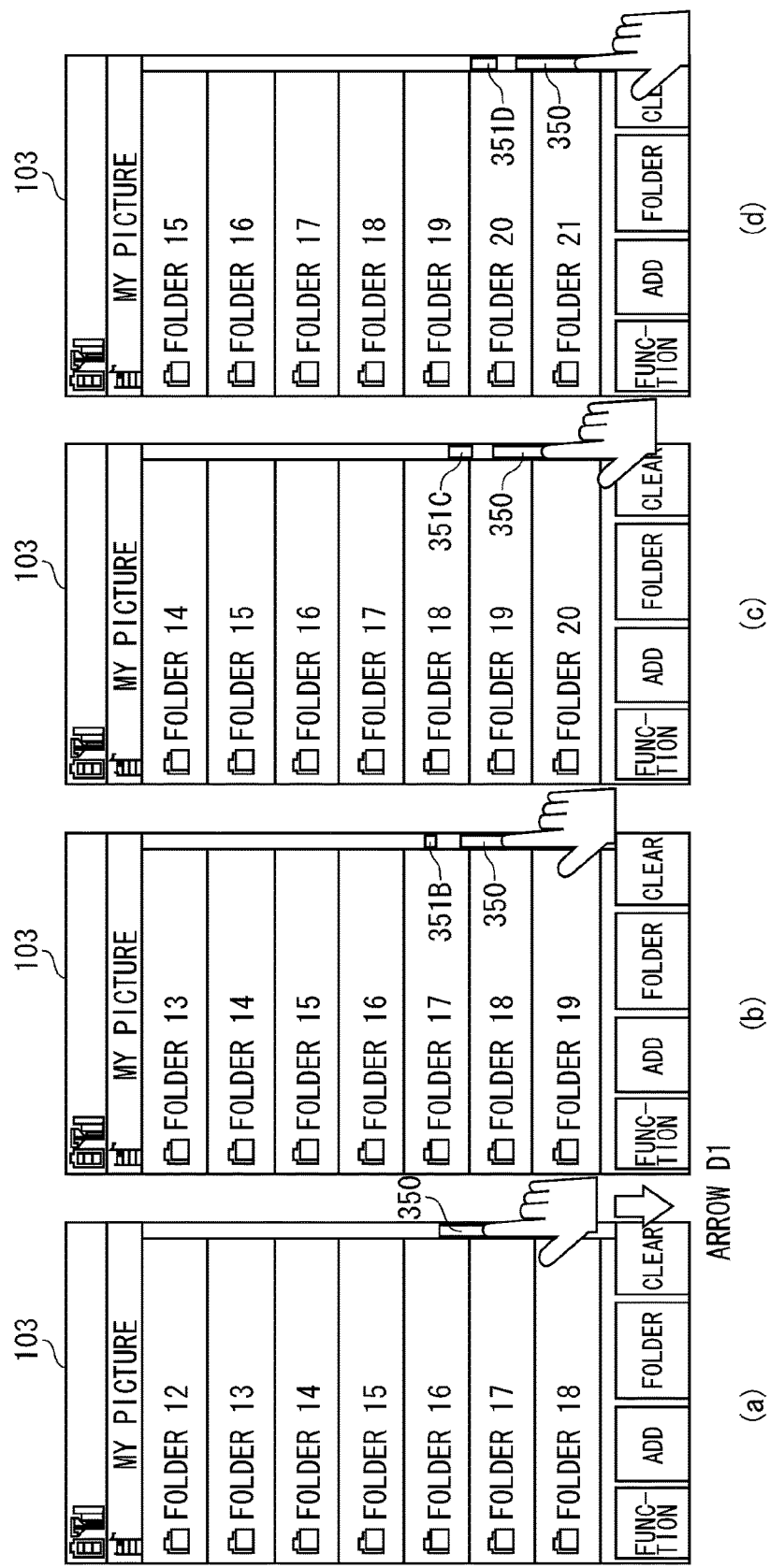
In FIG. 11, (a) to (d) are diagrams for explaining exemplary modification (2) of the fiducial bar 351 for flicking manipulation.
Figure 12:
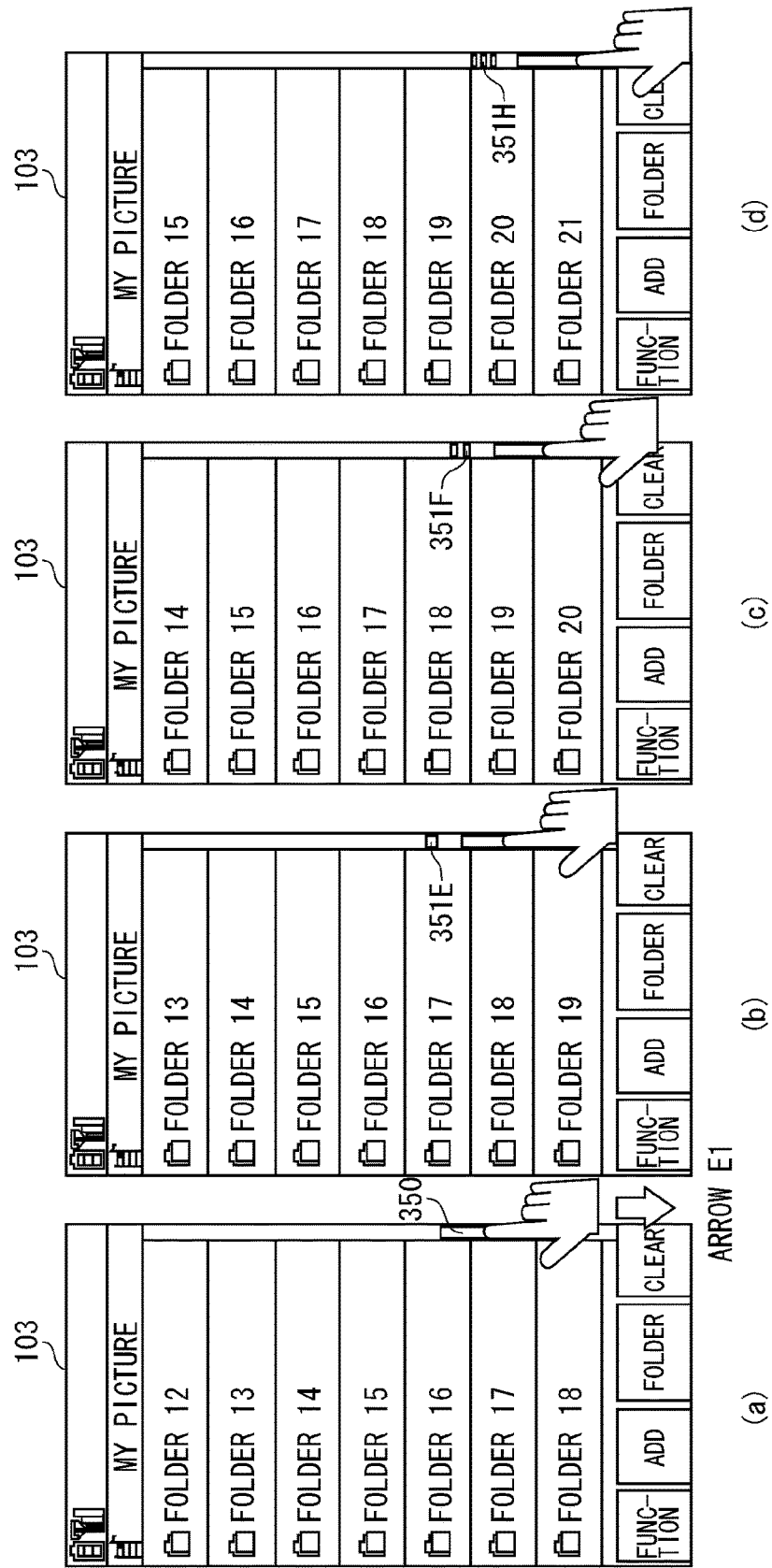
In FIG. 12, (a) to (d) are diagrams for explaining exemplary modification (3) of the fiducial bar 351 for flicking manipulation.

By reference to FIG. 10(*a*) to FIG. 12(*d*), an exemplary modification of the fiducial bar 351 for flicking manipulation of the cellular phone 300 according to the embodiment is now described. FIG. 10(*a*) to FIG. 10(*d*) show exemplary modification (1) of the fiducial bar 351 for flicking manipulation; FIG. 11(*a*) to FIG. 11(*d*) show exemplary modification (2) of the fiducial bar 351 for flicking manipulation; and FIG. 12(*a*) to FIG. 12(*d*) show exemplary modification (3) of the fiducial bar 351 for flicking manipulation.

By reference to FIGS. 10(*a*), 10(*b*), 10(*c*), and 10(*d*), the exemplary modification (1) of the fiducial bar 351 for flicking manipulation is described.

In FIG. 10(*a*), as in the case of FIG. 9(*a*), slide manipulation whose shift speed or shift amount exceeds the predetermined value in a direction designated by arrow C1 is performed on the scroll bar 350. Subsequently, the fiducial bar 351 for flicking manipulation is displayed on the display section 303. In FIG. 10(*a*) to FIG. 10(*d*), the amount of scroll shift achieved after flicking manipulation is changed according to the amount of shift originating from slide manipulation performed in the direction of arrow C1 shown in FIG. 10(*a*).

As shown in FIG. 10(*a*), when the scroll bar 350 is slid in the direction of arrow C1, the list of folder objects on the display section 303 is displayed while being slid in a direction opposite to the direction of arrow C1 as shown in FIG. 10(*b*). Since the amount of shift caused by slide manipulation is small at this time, a green fiducial bar 351G that is a fiducial for flicking manipulation appears in a movable range of the scroll bar 350. In this case, the amount of inertial scroll shift originating from flicking manipulation is set to a small value commensurate with an amount of slide shift to which the scroll bar 350 has been subjected.

Moreover, when the jump function is set, the list of objects of the display section 303 shifts from the position of the display section 303 shown in FIG. 10(*a*) to a position of the nearest bookmark.

Likewise, in FIG. 10(*d*), the list of the objects (folders 15 to 21) on the display section 303 is displayed while being deviated in a direction of arrow C1 with reference to the state shown in FIG. 10(*a*). Since the amount of slide shift is large at this time, a red fiducial bar 351R that is a fiducial for flicking manipulation appears in a movable range of the scroll bar 350. In this case, the amount of inertial scroll shift originating from flicking manipulation is set to a large value commensurate with an amount of slide shift to which the scroll bar 350 has been subjected.

Moreover, when the jump function is set, the list of objects of the display section 303 shifts from the position of the display section 303 shown in FIG. 10(*a*) to a position of the furthermost bookmark.

In FIG. 10(*c*), the list of objects (folders 14 to 20) on the display section 303 is displayed while being deviated in the direction of arrow C1 with reference to the state shown in FIG. 10(*a*). Since the amount of resultant slide shift is intermediate, at this time, between the amount of slide shift achieved in FIG. 10(*b*) and an amount of slide shift achieved in FIG. 10(*d*), a yellow fiducial bar 350Y that is a fiducial for flicking manipulation appears in a movable range of the scroll bar 350. In this case, the amount of inertial scroll shift originating from flicking manipulation is set to a middle value commensurate with an amount of slide shift to which the scroll bar 350 has been subjected.

Moreover, when the jump function is set, the list of objects of the display section 303 shifts from the position of the display section 303 shown in FIG. 10(*a*) to a position of a bookmark situated at a middle position between the furthermost bookmark and the nearest bookmark.

As above, the cellular phone 300 according to the embodiment displays the fiducial bars 351 for flicking manipulation in different colors on the display section 303 according to the amount of slide manipulation, whereby the user can control the amount of high speed scroll shift originating from flicking manipulation according to the amount of slide manipulation.

By reference to FIGS. 11(*a*) to 11(*d*), the exemplary modification (2) of the fiducial bar 351 for flicking manipulation is described.

In FIG. 11(*a*), as in the case of FIG. 9(*a*), slide manipulation whose shift speed or shift amount exceeds the predetermined value in the direction designated by arrow D1 is performed on the scroll bar 350. Subsequently, the fiducial bar 351 for flicking manipulation is displayed on the display section 303. In FIG. 11(*b*) to FIG. 11 (*d*), the amount of scroll shift achieved after flicking manipulation is changed according to the amount of shift originating from slide manipulation performed in the direction of arrow D1 shown in FIG. 11(*a*).

In FIG. 11(*b*), an amount of slide shift occurred in the scroll bar 350 in a direction of arrow D1 from a state shown in FIG. 11(*a*) is small. In this case, a fiducial bar 351B for flicking manipulation is displayed in; for instance, a thin line, on the display section 303. Furthermore, the amount of inertial scroll shift originating from flicking manipulation performed in a direction opposite to the arrow D1 is also set to a small value.

Moreover, when the jump function is set, the list of objects of the display section 303 shifts from the position of the display section 303 shown in FIG. 11(*a*) to a position of the nearest bookmark.

In FIG. 11(*d*), an amount of slide shift occurred in the scroll bar 350 in the direction of arrow D1 from a state shown in FIG. 11(*a*) is large. In this case, a fiducial bar 351D for flicking manipulation is displayed in; for instance, a thick line, on the display section 303.

Moreover, when the jump function is set, the list of objects of the display section 303 shifts from the position of the display section 303 shown in FIG. 11(*a*) to a position of the furthermost bookmark.

In FIG. 11(*c*), an amount of slide shift occurred in the scroll bar 350 in the direction of arrow D1 from a state shown in FIG. 11(*a*) is intermediate between the amount of slide shift achieved in FIG. 11(*b*) and the amount of slide shift achieved in FIG. 11(*d*). In this case, a fiducial bar 351C for flicking manipulation is displayed in; for instance, thickness that is intermediate between a thickness of the fiducial bar 351B and a thickness of the fiducial bar 351D.

Moreover, when the jump function is set, the list of objects of the display section 303 shifts from the position of the display section 303 shown in FIG. 11(*a*) to a position of a bookmark situated between the position of the bookmark shown in FIG. 11(*b*) and the position of the bookmark shown in FIG. 11(*d*).

As above, the cellular phone 300 according to the embodiment displays the fiducial bar 351 for flicking manipulation on the display section 303 while changing the thickness of the fiducial bar 351 according to the amount of slide manipulation, whereby the user can control the amount of inertial scroll shift originating from flicking manipulation according to the amount of slide manipulation.

By reference to FIGS. 12(a) to 12(d), the exemplary modification (3) of the fiducial bar 351 for flicking manipulation is described.

In FIG. 12(a), as in the case of FIG. 9(a), slide manipulation whose shift speed or shift amount exceeds the predetermined value in the direction designated by arrow E1 is performed on the scroll bar 350. Subsequently, the fiducial bar 351 for flicking manipulation appears on the display section 303. In FIG. 12(b) to FIG. 12(d), the amount of scroll shift achieved after flicking manipulation is changed according to the amount of shift originating from slide manipulation performed in the direction of arrow E1 shown in FIG. 12(a).

In FIG. 12(b), an amount of slide shift occurred in the scroll bar 350 in a direction of arrow E1 from a state shown in FIG. 12(a) is small. In this case, a fiducial bar 351E for flicking manipulation is displayed in; for instance, one line, on the display section 303. Furthermore, the amount of inertial scroll shift originating from flicking manipulation performed in a direction opposite to the arrow E1 is also set to a small value. Moreover, when the jump function is set, the list of objects of the display section 303 shifts from the position of the display section 303 shown in FIG. 12(a) to a position of the nearest bookmark.

In FIG. 12(d), an amount of slide shift occurred in the scroll bar 350 in the direction of arrow E1 from a state shown in FIG. 12(a) is large. In this case, a fiducial bar 351H for flicking manipulation is displayed in; for instance, three lines, on the display section 303. Furthermore, the amount of inertial scroll shift originating from flicking manipulation performed in a direction opposite to the arrow E1 is also set to a large value.

Moreover, when the jump function is set, the list of objects of the display section 303 shifts from the position of the display section 303 shown in FIG. 12(a) to a position of the furthermost bookmark.

In FIG. 12(c), an amount of slide shift occurred in the scroll bar 350 in the direction of arrow E1 from a state shown in FIG. 12(a) is intermediate between the amount of slide shift achieved in FIG. 12(b) and the amount of slide shift achieved in FIG. 12(d). In this case, a fiducial bar 351F for flicking manipulation is displayed in; for instance, two lines situated between the fiducial bar 351E and the fiducial bar 351G, on the display section 303. Furthermore, the amount of inertial scroll shift originating from flicking manipulation performed in a direction opposite to the arrow E1 is set to a middle value between the scroll shift amount achieved in FIG. 12(b) and the scroll shift amount achieved in FIG. 12(d).

Moreover, when the jump function is set, the list of objects of the display section 303 shifts from the position of the display section 303 shown in FIG. 12(a) to a position of a bookmark situated between the furthermost bookmark and the nearest bookmark.

As above, the cellular phone 300 according to the embodiment displays the fiducial line for flicking manipulation on the display section 303 while changing the number of fiducial lines according to the amount of slide manipulation, whereby the user can control the amount of inertial scroll shift originating from flicking manipulation according to the amount of slide manipulation. The fiducial bars 351G, 351R, 351Y, the fiducial bars 351B, 351C, 351D, and the fiducial bars 351E, 351F, 351H that are all exemplary modifications of the fiducial bar 351 belong to the objects of the display section 103 and are examples of the second object.

By reference to FIGS. 13 to 16, operation procedures pertaining to high speed scroll manipulation in the cellular phone 300 according to the embodiment are now described. FIGS. 13 through 16 correspond to diagrams (1) to (4) showing an operation flow of the cellular phone 300 pertaining to high speed scroll manipulation.

Figure 13:
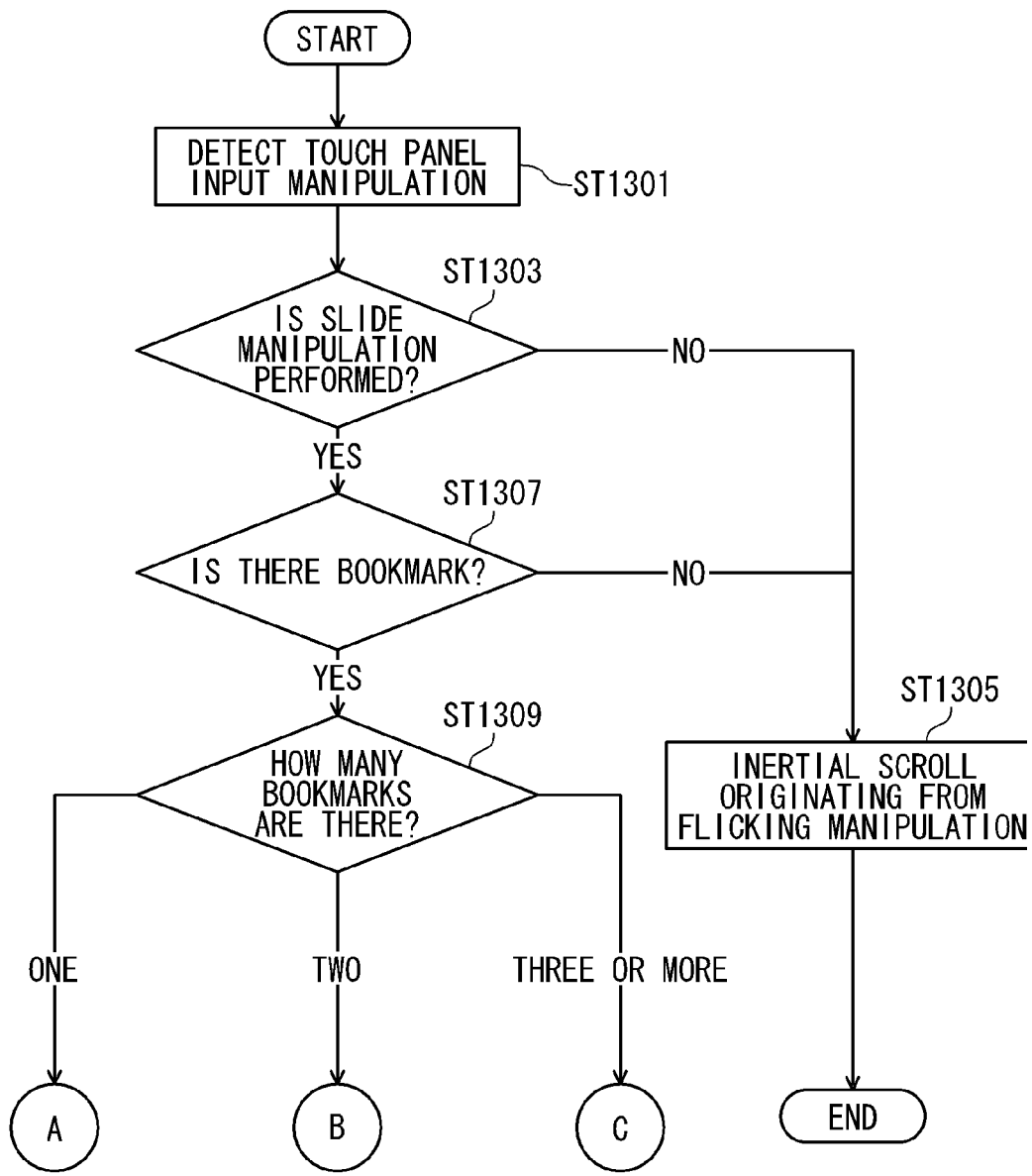
FIG. 13 is a diagram (1) for explaining an operation flow of the cellar phone 300 pertaining to high speed inertial scroll manipulation.

FIG. 13 is a diagram (1) showing an operation flow of the cellular phone 300 pertaining to high speed scroll manipulation.

In step ST1301, the touch panel 101 detects user's touch panel input manipulation. Processing then proceeds to branch ST1303.

In branch ST1303, the touch determination section 313 determines whether or not slide manipulation is performed as user's touch panel input manipulation. When the slide manipulation is determined to be performed (YES), processing proceeds to branch ST1307. In contrast, when slide manipulation is determined not to be performed (NO), processing proceeds to step ST1305.

In branch ST1307, the bookmark determination section 315 determines whether or not there is a bookmark in the objects of the display section 303. The object on the display section 303 also includes a virtual continuous extent outside the display screen. When there is a bookmark in the object on the display section 303 (YES), processing proceeds to branch ST1309. In contrast, when there is not any bookmark in the object on the display section 303 (NO), processing proceeds to step ST1305.

In branch ST1309, the bookmark determination section 315 determines the number of bookmarks in the objects of the display section 303. When the number of bookmarks is one, processing proceeds to step ST1401 shown in FIG. 14. When the number of bookmarks is two, processing proceeds to branch ST1501 shown in FIG. 15. When the number of bookmarks is three or more, processing proceeds to branch ST1601 shown in FIG. 16.

In step ST1305, flicking manipulation does not straddle the fiducial line, the jumping control unit 311 causes the display section 303 to perform an inertial scroll that originates from flicking manipulation. The processing flow pertaining to high speed scroll manipulation thus ends.

Figure 14:
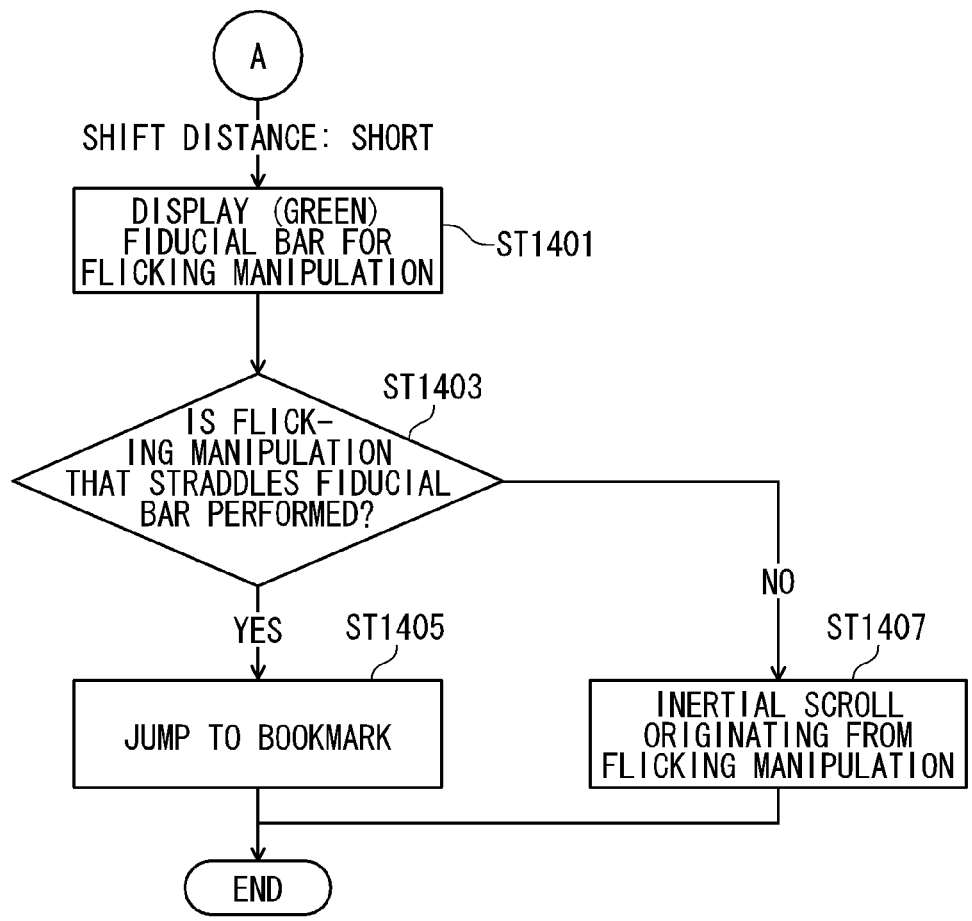
FIG. 14 is a diagram (2) for explaining an operation flow of the cellar phone 300 pertaining to the high speed inertial scroll manipulation.

FIG. 14 is a diagram (2) showing an operation flow of the cellular phone 300 pertaining to high speed scroll manipulation. When the bookmark determination section 315 determines the number of bookmarks in the objects of the display section 303 as one in branch ST1309, operation flow of the cellular phone 300 goes to step ST1401 shown in FIG. 14.

In step ST1401, the jumping control unit 311 displays a green line as the fiducial bar 351 for flicking manipulation within a movable range of the scroll bar 350 on the display section 303. Processing then proceeds to branch ST1403. In step ST1401, one line or a thin line can also be displayed in the display section 303 as the fiducial bar 351 for flicking manipulation.

In branch ST1403, the touch determination section 313 detects whether or not the flicking manipulation straddles the (green) fiducial bar 351G. When the flicking manipulation straddles the (green) fiducial bar 351 (Yes), processing proceeds to step ST1405. In contrast, when the flicking manipulation does not straddle the (green) fiducial bar 351 (No), processing proceeds to step ST1407.

In step ST1405, the jumping control unit 311 causes the display section 303 to perform a high speed scroll in a direction opposite to the direction of flicking manipulation. In this case, the object on the display section 303 jumps to a position of a bookmark situated at the nearest position (the first bookmark) according to a (short) shift distance of the slide manipulation. A processing flow pertaining to high speed scroll manipulation thus ends.

In step ST1407, since flicking manipulation does not straddle the fiducial line, the jumping control unit 311 causes the display section 303 to perform inertial scroll that originates from the flicking manipulation. The processing flow pertaining to high speed scroll manipulation ends.

Figure 15:
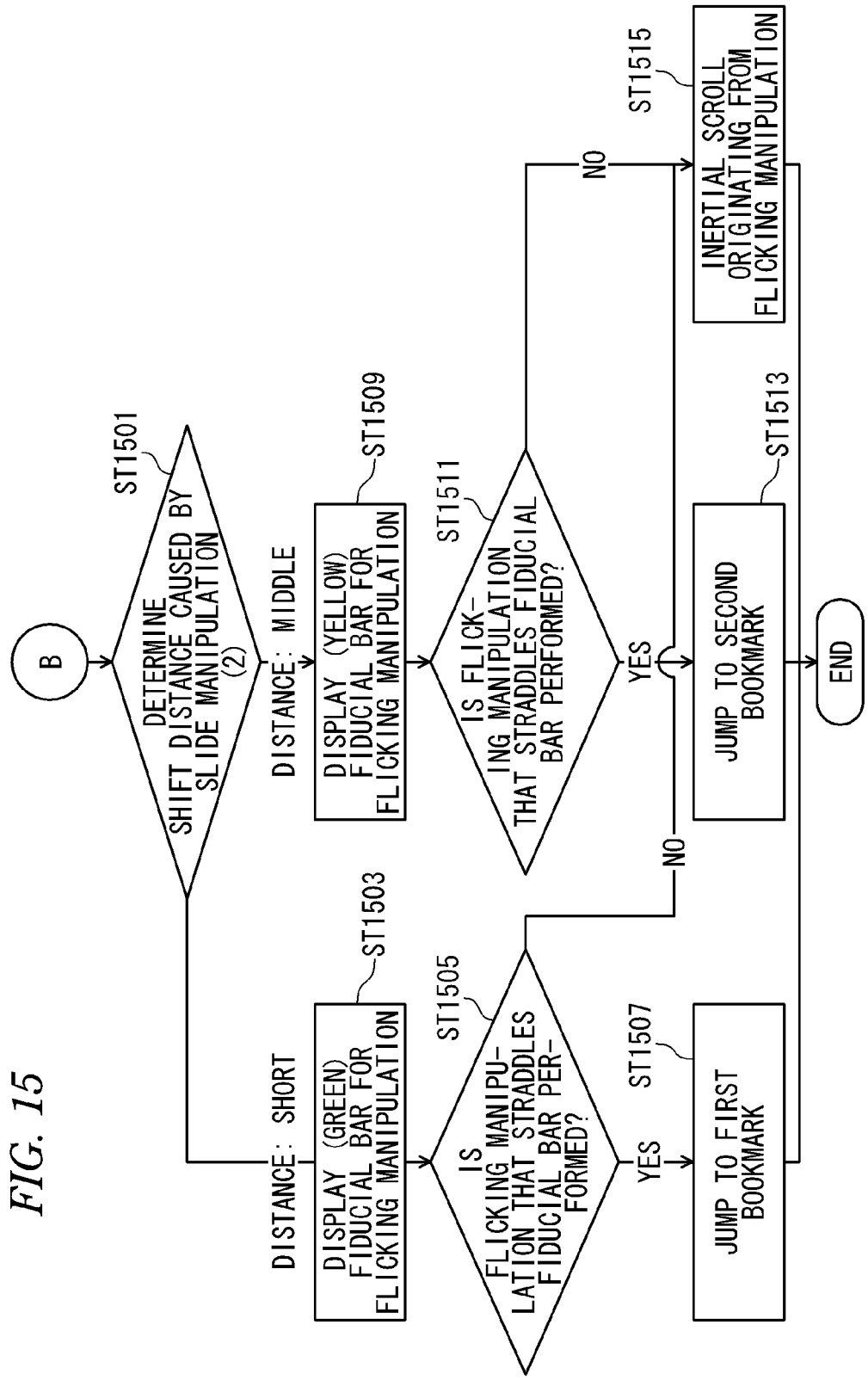
FIG. 15 is a diagram (3) for explaining an operation flow of the cellar phone 300 pertaining to the high speed inertial scroll manipulation.

FIG. 15 is a diagram (3) showing an operation flow of the cellular phone 300 pertaining to high speed scroll manipulation. When the bookmark determination section 315 determines the number of bookmarks in the objects of the display section 303 as two in branch ST1309, the operation flow of the cellular phone 300 goes to branch ST1501 shown in FIG. 15 ("Determination 2 of a shift distance caused by slide manipulation").

In branch ST1501, the touch determination section 313 determines slide manipulation and a shift direction and a shift distance of the slide manipulation as user's touch panel input manipulation. When the user's touch panel input manipulation is slide manipulation and when a shift distance caused by the slide manipulation is short, processing proceeds to step ST1503. In contrast, when the user's touch panel input manipulation is slide manipulation and when the shift distance caused by the slide manipulation is intermediate, processing proceeds to step ST1509.

In step ST1503, the jumping control unit 311 displays a green line in the movable range of the scroll bar 350 as the fiducial bar 351 for flicking manipulation in the display section 303. Processing proceeds to branch ST1505. Alternatively, in step ST1503, one line or a thin line can also be displayed as the fiducial bar 351B for flicking manipulation in the display section 303.

In branch ST1505, the touch determination section 313 detects whether or not flicking manipulation straddles the (green) fiducial bar 351. When the flicking manipulation straddles the (green) fiducial bar 351 (Yes), processing proceeds to step ST1507. In contrast, when the flicking manipulation does not straddle the (green) fiducial bar 351 (No), processing proceeds to step ST1515.

In step ST1507, the jumping control unit 311 causes the display section 303 to perform a high speed scroll in a direction opposite to the direction of flicking manipulation. In this case, the object on the display section 303 jumps to a position of the bookmark situated at the nearest position according to the (short) shift distance of the slide manipulation. The processing flow pertaining to high speed scroll manipulation thus ends.

In step ST1509, the jumping control unit 311 displays a yellow line in the movable range of the scroll bar 350 on the display section 303 as the fiducial bar 351 for flicking manipulation. Processing proceeds to branch ST1511. Alternatively, in step ST1509, one line or a thin line can also be displayed as the fiducial bar 351 for flicking manipulation in the display section 303.

In branch ST1511, the touch determination section 313 detects whether or not flicking manipulation straddles the (yellow) fiducial bar 351. When the flicking manipulation straddles the fiducial bar 351 (Yes), processing proceeds to step ST1513. In contrast, when the flicking manipulation does not straddle the (yellow) fiducial bar 351 (No), processing proceeds to step ST1515.

In step ST1513, the jumping control unit 311 causes the display section 303 to perform a high speed scroll in a direction opposite to the direction of flicking manipulation. In this case, the object on the display section 303 jumps to a position of a bookmark situated at the second nearest position according to a (middle) shift distance of the slide manipulation. The processing flow pertaining to high speed scroll manipulation thus ends.

In step ST1515, since flicking manipulation does not straddle the fiducial line, the jumping control unit 311 causes the display section 303 to perform inertial scroll that originates from the flicking manipulation. The processing flow pertaining to high speed scroll manipulation ends.

Figure 16:
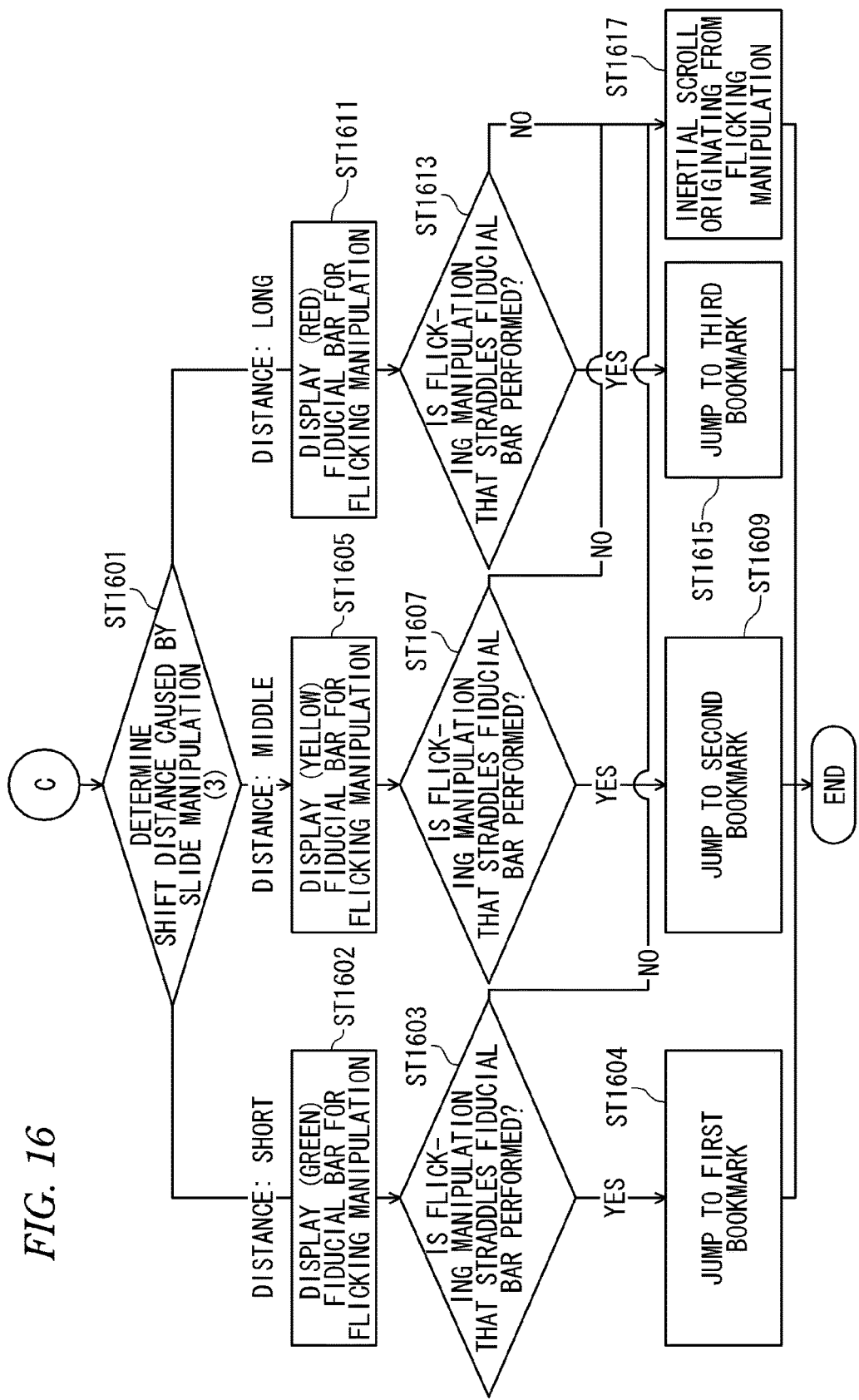
FIG. 16 is a diagram (4) for explaining an operation flow of the cellar phone 300 pertaining to the high speed inertial scroll manipulation.

FIG. 16 is a diagram (4) showing an operation flow of the cellular phone 300 pertaining to high speed scroll manipulation. When the bookmark determination section 315 determines the number of bookmarks in the objects of the display section 303 as three or more in branch ST1309, operation flow of the cellular phone 300 goes to branch ST1601 shown in FIG. 16 ("Determination 3 of a shift distance caused by slide manipulation").

In branch ST1601, the touch determination section 313 determines slide manipulation and a shift direction and a shift distance of the slide manipulation as user's touch panel input manipulation. When the user's touch panel input manipulation is slide manipulation and when a shift distance caused by the slide manipulation is short, processing proceeds to step ST1602. In contrast, when the user's touch panel input manipulation is slide manipulation and when the shift distance caused by the slide manipulation is intermediate, processing proceeds to step ST1605. Moreover, when the user's touch panel input manipulation is slide manipulation and when the shift distance caused by the slide manipulation is long, processing proceeds to step ST1611.

In step ST1602, the jumping control unit 311 displays a green line in the movable range of the scroll bar 350 on the display section 303 as the fiducial bar 351 for flicking manipulation. Processing proceeds to branch ST1603. Alternatively, in step ST1602, one line or a thin line can also be displayed as the fiducial bar 351 for flicking manipulation in the display section 303.

In branch ST1603, the touch determination section 313 detects whether or not flicking manipulation straddles the (green) fiducial bar 351G. When the flicking manipulation straddles the (green) fiducial bar 351 (Yes), processing proceeds to step ST1604. In contrast, when the flicking manipulation does not straddle the (green) fiducial bar 351 (No), processing proceeds to step ST1617.

In step ST1604, the jumping control unit 311 causes the display section 303 to perform a high speed inertial scroll in a direction opposite to the direction of flicking manipulation. In this case, the object on the display section 303 jumps to the position of the bookmark situated at the nearest position (the first bookmark) according to the (short) shift distance of the slide manipulation. The processing flow pertaining to high speed scroll manipulation thus ends.

In step ST1605, the jumping control unit 311 displays a yellow line in the movable range of the scroll bar 350 on the display section 303 as the fiducial bar 351 for flicking manipulation. Processing proceeds to branch ST1607. Alternatively, in step ST1605, one line or a thin line can also be displayed on the display section 303 as the fiducial bar 351 for flicking manipulation.

In branch ST1607, the touch determination section 313 detects whether or not flicking manipulation straddles the (yellow) fiducial bar 351. When the flicking manipulation straddles the fiducial bar 351 (Yes), processing proceeds to step ST1609. In contrast, when the flicking manipulation does not straddle the (yellow) fiducial bar 351 (No), processing proceeds to step ST1617.

In step ST1609, the jumping control unit 311 causes the display section 303 to perform a high speed inertial scroll in a direction opposite to the direction of flicking manipulation. In this case, the object on the display section 303 jumps to the position of the bookmark (the second bookmark) situated at the second nearest position according to the (middle) shift distance of the slide manipulation. The processing flow pertaining to high speed scroll manipulation thus ends.

In step ST1611, the jumping control unit 311 displays a red line in the movable range of the scroll bar 350 on the display section 303 as the fiducial bar 351 for flicking manipulation. Processing proceeds to branch ST1613. Alternatively, in step ST1611, three lines or a thick line can also be displayed on the display section 303 as the fiducial bar 351 for flicking manipulation.

In branch ST1613, the touch determination section 313 detects whether or not flicking manipulation straddles the (red) fiducial bar 351. When the flicking manipulation straddles the fiducial bar 351 (Yes), processing proceeds to step ST1615. In contrast, when the flicking manipulation does not straddle the (red) fiducial bar 351 (No), processing proceeds to step ST1617.

In step ST1615, the jumping control unit 311 causes the display section 303 to perform a high speed inertial scroll in a direction opposite to the direction of flicking manipulation. In this case, the object on the display section 303 jumps to a position of a bookmark (the third bookmark) situated at the third nearest position according to a (long) shift distance of the slide manipulation. The processing flow pertaining to high speed scroll manipulation thus ends.

As above, the cellular phone 300 according to the second embodiment can reliably shift the object on the display section 303 to a predetermined position by means of a smaller amount of manipulation through use of the slide manipulation and the flicking manipulation performed on the scroll bar. By means of the slide manipulation and the flicking manipulation performed on the scroll bar, the user can jump the object on the display section 303 to the position of the bookmark while visually ascertaining the object on the display section 303 that is a target for shift.

In the cellular phone 300 according to the embodiment, the fiducial line that serves as a fiducial for flicking manipulation is displayed in the display section 303. Accordingly, distinguishing between when the display section 303 is shifted at high speed to a predetermined position by an inertial scroll and when the display section 303 is shifted by means of an ordinary inertial scroll can be carried out by means of flicking manipulation that straddles the fiducial line and flicking manipulation that does not straddle the fiducial line.

In the cellular phone 300 according to the embodiment, by changing the way to display the fiducial line for flicking manipulation according to the amount of slide manipulation, the user can control an amount of high speed inertial scroll shift originating from the flicking manipulation according to the amount of shift caused by slide manipulation.

Third Embodiment

A cellular phone 500 of a third embodiment serving as an embodiment of the electronic device of the invention actualizes manipulations with regard to an object of a display section 503; namely, (1) manipulation for jumping an object on the display section 503 to a position of a marker (a bookmark) by means of slide manipulation performed in a first direction and flicking manipulation performed in a second direction opposite to the first direction and (2) manipulation for performing high speed inertial scroll of the object on the display section 503 by means of slide manipulation performed in a third direction differing from the first and second directions and flicking manipulation performed in a fourth direction opposite to the third direction. By means of the manipulations, the cellular phone 500 of the third embodiment can shift the object on the display section 503 a desired position (a position of the bookmark) faster when compared with the case of the first and second embodiments.

An inertial scroll referred to in the embodiment means the followings. On occasions when a change is performed on a display mode of the object on the display section 503 on the touch panel 101 on the basis of a manipulation input to the touch panel 101, an object exhibiting a virtual continuous extent outside the display screen is scrolled in one certain direction on the display section 503 while taking a shift speed caused by the touch input manipulation as an initial rate, when it is detected that touch input manipulation whose shift speed or shift amount exceeds a predetermined value has been performed on the object in the certain direction.

Figure 17:
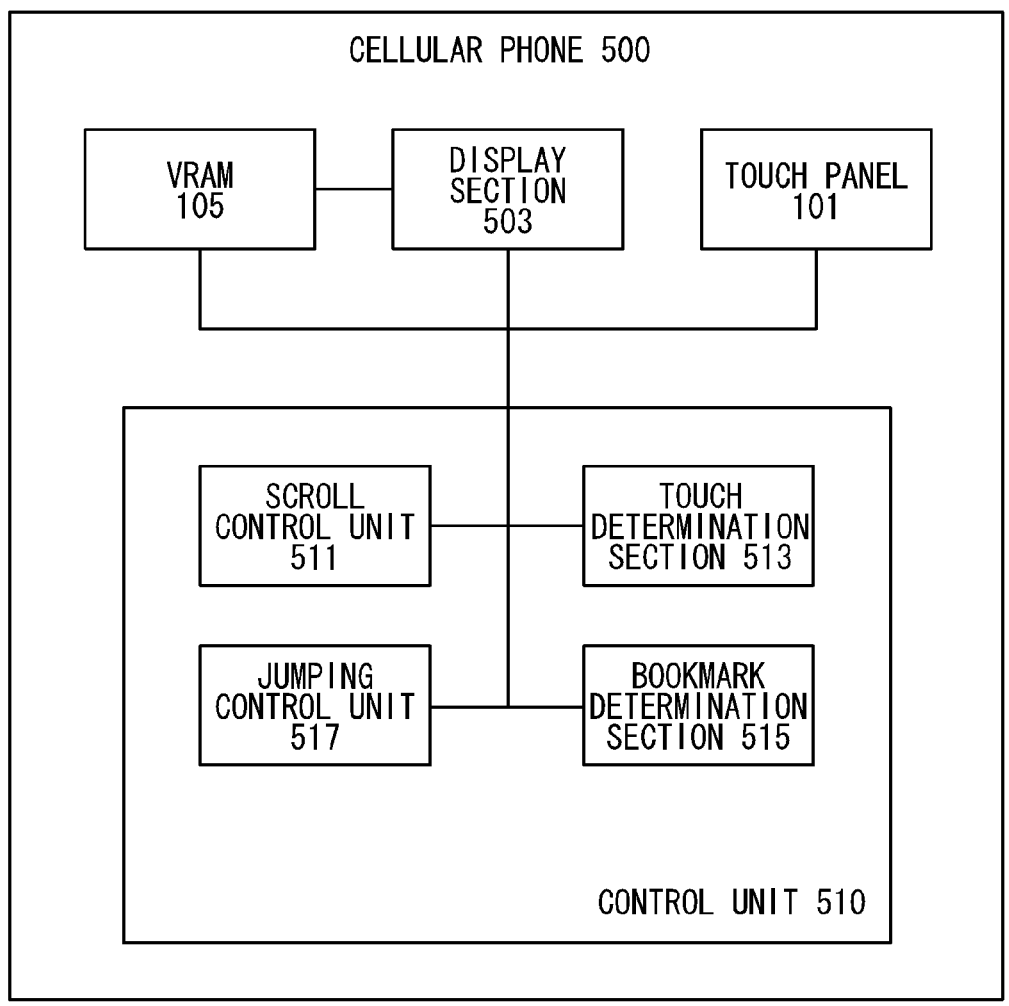
FIG. 17 is a block diagram showing a configuration of a cellular phone 500 of a third embodiment.

A configuration of the cellular phone 500 is now described as an embodiment of the electronic device of the invention by reference to FIG. 17. FIG. 17 is a block diagram showing a configuration of the cellular phone 500. The cellular phone 500 shown in FIG. 17 includes the touch panel 101, the display section 503, the storage 105, and a control unit 510. The control unit 510 has a scroll control unit 511, a touch determination section 513, a bookmark determination section 515, and a jumping control unit 517.

Figure 18:
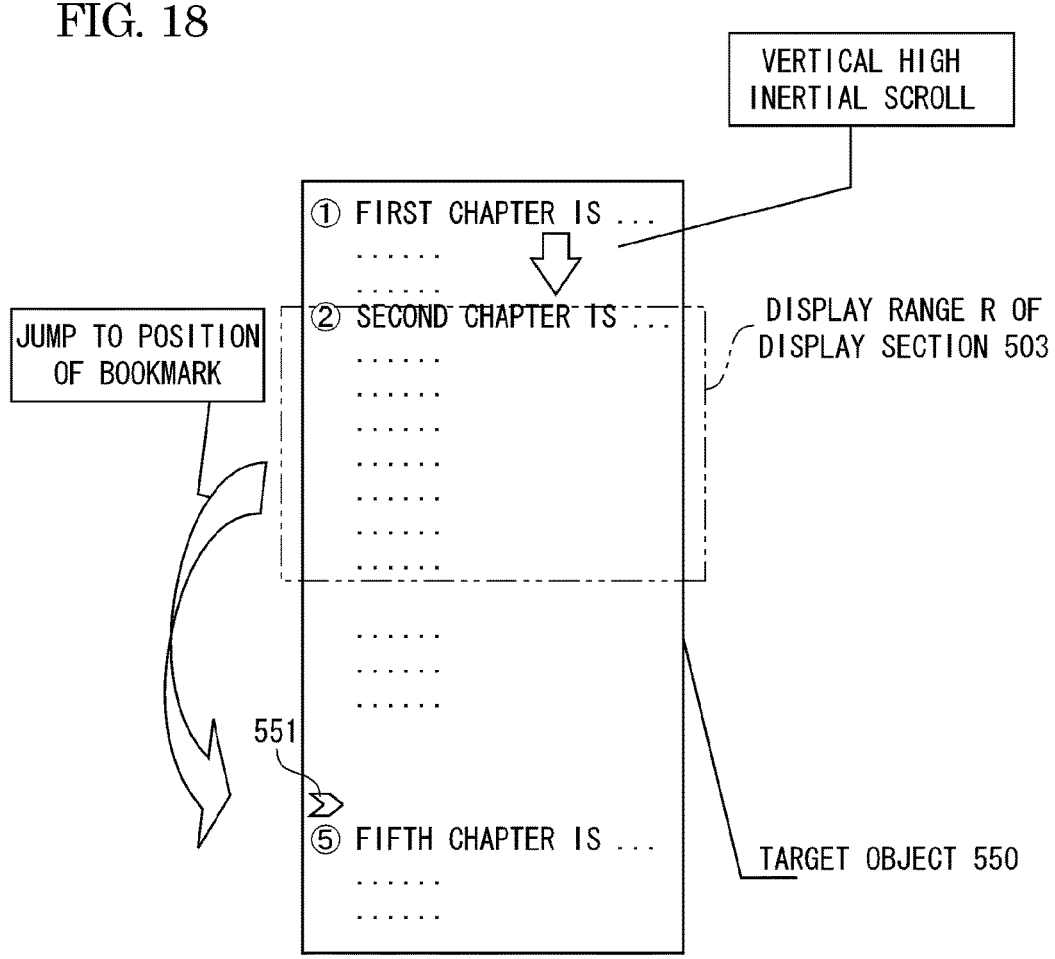
FIG. 18 is a diagram for explaining an object 550 to be displayed on a display section 503.

By reference to FIG. 18, an object 550 to be displayed on the display section 503 according to the embodiment is now described. FIG. 18 is a diagram for explaining the object 550 displayed on the display section 503. As shown in FIG. 18, the object 550 to be displayed on the display section 503 is made up of text data, and the text data includes the first chapter to the fifth chapter. A bookmark 551 is presumed to be set in advance at a head position of the text data "Fifth Chapter." Since an entire range of the object 550 cannot be displayed all together, a portion (text data pertaining to the "second chapter") of the object 550 belonging to a display range R enclosed by a chain double-dashed line in FIG. 18 is displayed in the display section 503. The object 550 is an example of a first object or an object of a third object.

Figure 19:
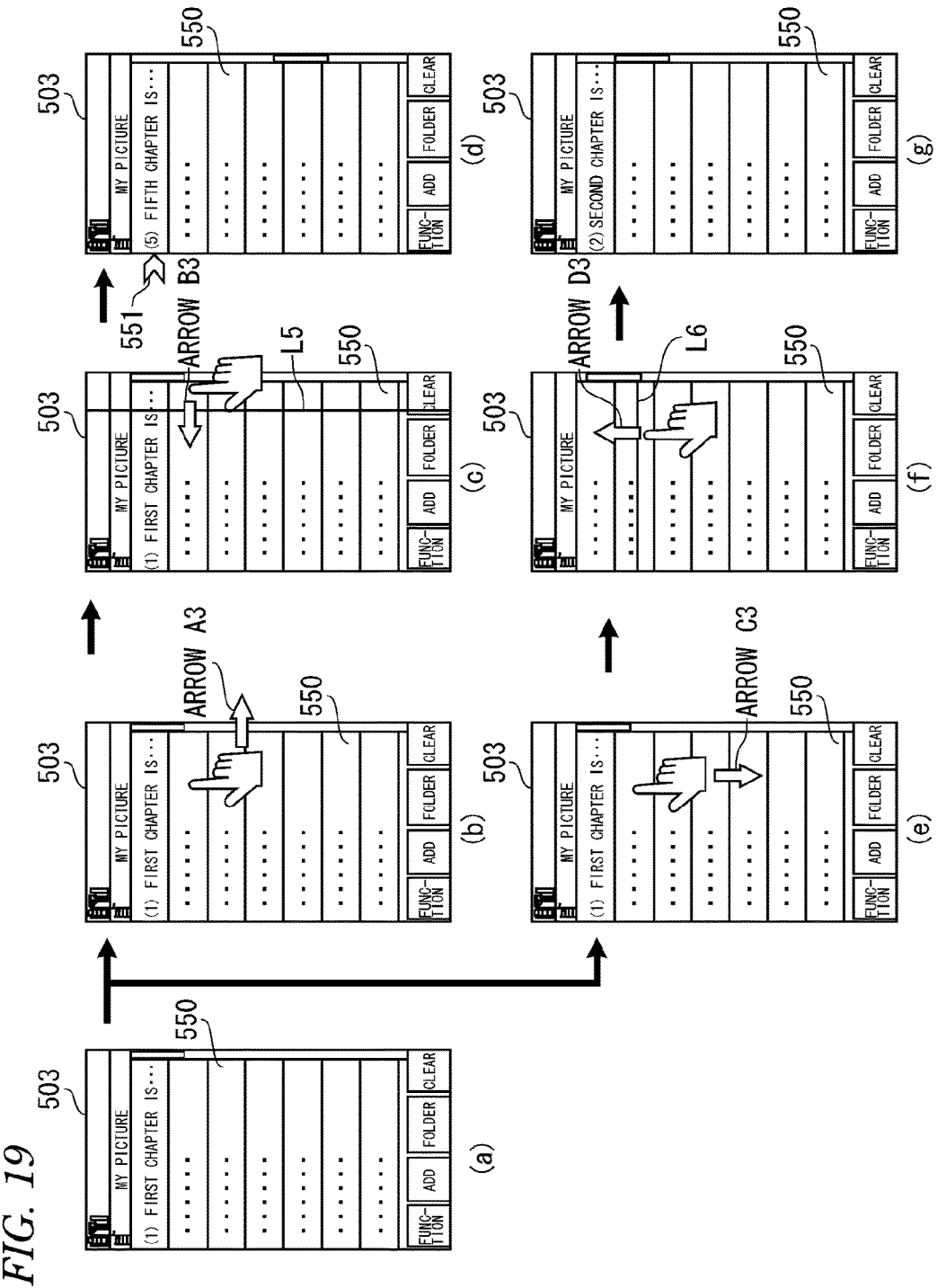
In FIG. 19, (a) to (g) are diagrams for explaining an example of scroll manipulation of the display section 504.

By reference to FIG. 19(a) to FIG. 19(g), there is described an example of scroll manipulation of the display section 503 performed with regard to the object 550 shown in FIG. 18. FIG. 19(a) to FIG. 19(g) are diagrams for explaining an example of scroll manipulation of the display section 503. As shown in FIG. 19(a), a portion (the "first chapter" portion) of the object 550 is presumed to be displayed in the display section 503.

(Jump Function)

As shown in FIG. 19(b), when slide manipulation whose shift speed or shift amount exceeds a predetermined value is performed, in a horizontal direction (a direction designated by arrow A3), to a portion (the "first chapter" portion) of the object 550, a fiducial line L5 for flicking manipulation is displayed in the display section 503 in the vertical direction of the display section 503 as shown in FIG. 19(c). When flicking manipulation is performed in a direction of arrow B3 (a direction opposite to the arrow A3) so as to straddle the fiducial line L5, the display section 503 causes a jump to a head position of a portion of the object 550 (the "fifth chapter" portion) where the bookmark 551 is set in advance, as shown in FIG. 19(d). When there are a plurality of bookmarks, the cellular phone 500 according to the embodiment can control an amount of jump shift according to the amount of shift originating from slide manipulation.

(High Speed Scroll Function)

As shown in FIG. 19(e), when slide manipulation whose shift speed or shift amount exceeds a predetermined value is performed, in a vertical direction (a direction designated by arrow C3), to the portion (the "first chapter" portion) of the object 550, a fiducial line L6 for flicking manipulation is displayed in the display section 503 in the horizontal direction of the display section 503 as shown in FIG. 19(f). When flicking manipulation is performed in a direction of arrow D3 (a direction opposite to the arrow C3) so as to straddle the fiducial line L6, a high speed inertial scroll is performed up to a portion of the object 550 (the "second chapter" portion), as shown in FIG. 19(g).

An amount of scroll shift originating from the flicking manipulation that straddles the fiducial line L6 is greater than an amount of scroll shift originating from flicking manipulation that does not straddle the fiducial line L6. Incidentally, the cellular phone 500 according to the embodiment can control an amount of scroll shift according to the amount of slide manipulation.

As above, the cellular phone 500 of the third embodiment can jump the object 550 of the display section 503 to the position of the marker (a bookmark 551) by means of (1) slide manipulation in a first direction (a direction designated by arrow A3) and a predetermined amount of flicking manipulation performed in a second direction (a direction designated by arrow B3) opposite to the first direction. Moreover, the cellular phone 500 of the third embodiment can perform high speed inertial scroll of the object 550 of the display section 503 by means of slide manipulation in a third direction (a direction designated by arrow C3) differing from the first and second directions and a predetermined amount of flicking manipulation in a fourth direction (a direction designated by arrow D3) that is opposite to the third direction. When compared with the first and second embodiments, the cellular phone 500 of the third embodiment can shift the object on the display section 503 faster to a desired position.

The touch panel 101 detects a direction, a shift speed, and a shift amount of user's touch input manipulation on the basis of coordinates allocated to a touch panel plane, by means of a pressure sensor, or the like. Detection results are output to the touch determination section 513.

Various objects to be subjected to user's touch manipulation are displayed in the display section 503 on the touch panel 101. In relation to various objects displayed in the display section 503, positional information about a display position of an object and information about physical attributes of the object are stored, on the basis of the coordinates allocated to the touch panel plane, as "object information" in the storage 105. The storage 105 is formed from; for instance, VRAM (Video Random Access Memory).

The touch determination section 513 makes a reference to the object information. Information about (virtual) physical attributes of the object can be displayed by making physical manipulation on the object on the basis of its attribute. Virtual physical attributes include; for instance, a weight, hardness/softness, friction resistance, and attracting force (gravity), and others, of the object.

The cellular phone 500 according to the embodiment is configured so as to be able to liken the display section 503 to a real space, deem touch input manipulation detected by the touch panel 101 as if physical manipulation were performed on the object displayed in the display section 503, and display the object while imparting corresponding physical manipulation on the object.

In order to actualize the above-mentioned display mode, the touch determination section 513 determines; for instance, a type, direction, and shift distance of user's touch input manipulation, on the basis of a detection result output from the touch panel 101 and the object information to which a reference has been made. Types of user's touch input manipulation include; for instance, slide manipulation and flicking manipulation. A direction of user's touch input manipulation corresponds to an arbitrary direction on the touch panel.

When the touch determination section 513 determines slide manipulation performed in the first direction (the direction designated by arrow A3) and the predetermined amount of flicking manipulation performed in the second direction (the direction designated by arrow B3) that is opposite to the first direction, the determination result is output to the jumping control unit 517. Further, when the touch determination section 513 determines slide manipulation performed in a third direction (a direction designated by arrow C3) differing from the first and second directions and a predetermined amount of flicking manipulation performed in a fourth direction (a direction designated by arrow D3) that is opposite to the third direction, determination results are output to the scroll control unit 511.

On the basis of the determination result pertaining to the type of touch input manipulation made by the touch determination section 513, the scroll control unit 511 makes manipulation for changing a display mode determined according to a type of touch input manipulation on the object, thereby controlling a display of the display section 503. Manipulation for changing a predetermined display mode is display manipulation for imparting virtual physical manipulation to an object corresponding to a touch input. Specifically, the scroll control unit 511 determines what physical manipulation has been performed on the object on the basis of a physical attribute of the object and the determination result made by the touch determination section 513 and controls the display section 503 so as to effect; for instance, a high speed inertial scroll of the object.

The jumping control unit 517 causes the display section 503 to display an index (a fiducial line) serving as a fiducial for jump manipulation.

The bookmark determination section 515 determines whether or not there is a mark (a bookmark) denoting a destination employed when a jump function is utilized for an object (including the outside of the display screen) appearing on the display section 503 described by reference to FIG. 19(a) to FIG. 19(d). Moreover, the bookmark determination section 515 also determines the number of bookmarks in the object appearing on the display section 503 (including the outside of the display screen). A determination result of the bookmark determination section 515 is output to the jumping control unit 517. A position of a mark (a bookmark) representing a destination of the object employed when the jump function is used is set on the basis of; for instance, a distance from a position (the furthermost position, the nearest position, a middle position therebetween, and others) appearing on the display section 503 according to a shift distance of slide manipulation.

On the basis of the determination result from the bookmark determination section 515 and the determination result from the touch determination section 513, the jumping control unit 517 gives the object manipulation for changing the display mode determined according to the type of touch input manipulation, thereby controlling a display of the display section 503. The manipulation for changing a predetermined display mode is display manipulation for imparting virtual jump manipulation to an object corresponding to a touch input. Specifically, the jumping control unit 517 causes the object on the display section 503 to jump to the position of the bookmark according to a shift distance of slide manipulation. Further, the jumping control unit 517 causes the display section 503 to display an index (a fiducial bar) that serves as a fiducial for jump manipulation.

Under display control of the scroll control unit 511 and the jumping control unit 517, the display section 503 displays an object conforming to the type of user's touch input manipulation.

By reference to FIG. 20 to FIG. 24, operation procedures pertaining to high speed scroll manipulation in the cellular phone 500 according to the embodiment are now described. FIGS. 20 to 24 are diagrams (1) to (5) showing operation flow of the cellular phone 500 pertaining to high speed scroll manipulation.

Figure 20:
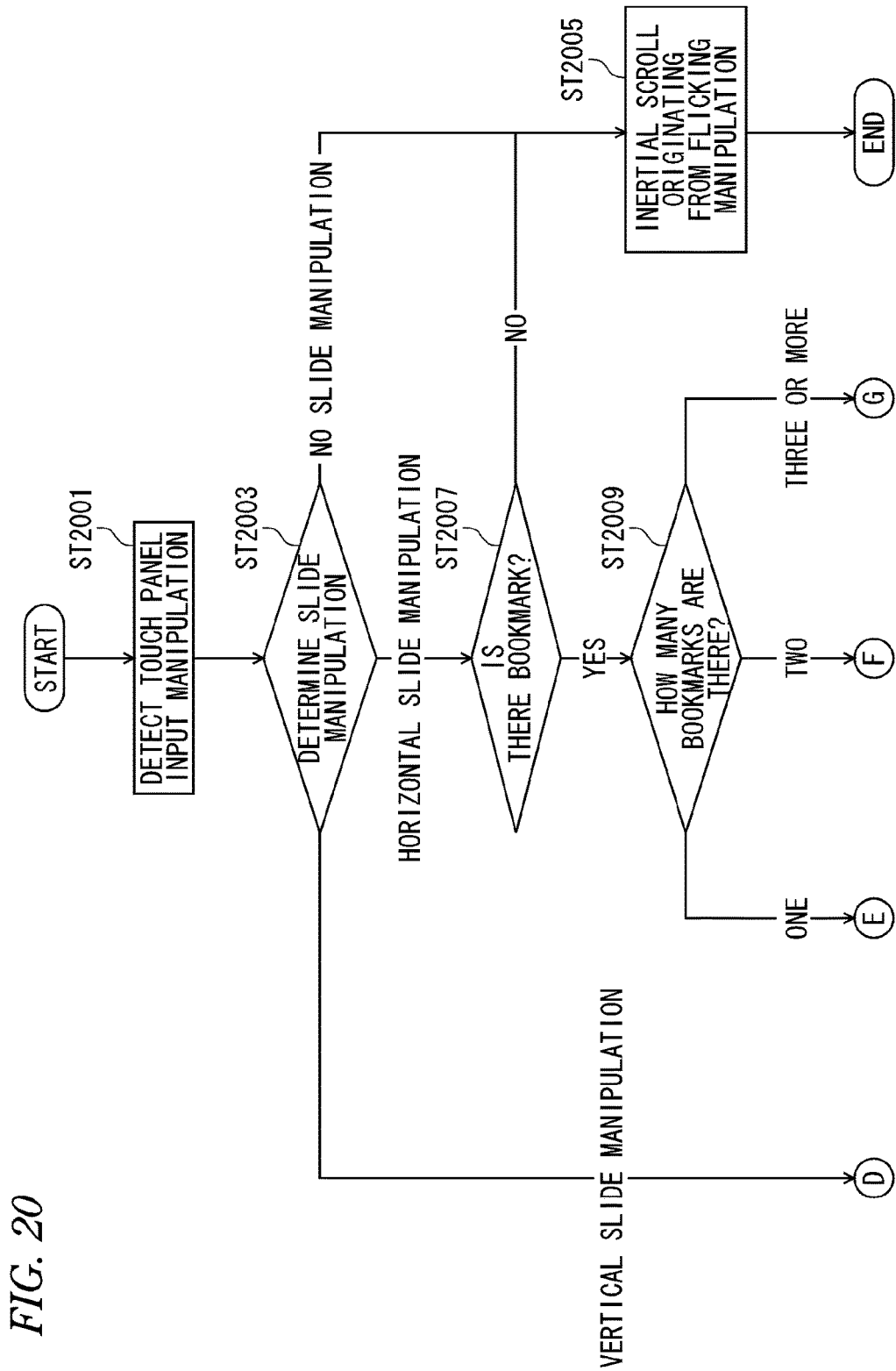
FIG. 20 is a diagram (1) for explaining an operation flow of the cellar phone 500 pertaining to a high speed inertial scroll manipulation.

FIG. 20 is a diagram (1) showing operation flow of the cellular phone 500 pertaining to high speed scroll manipulation.

In step ST2001, the touch panel 101 detects user's touch panel input manipulation. Processing then proceeds to branch ST2003.

In branch ST2003, the touch determination section 513 determines type of slide manipulation, as user's touch panel input manipulation, and whether or not slide manipulation is performed. When slide manipulation is determined to be made in the vertical direction, processing proceeds to branch ST2401 shown in FIG. 24. In contrast, when slide manipulation is determined to be made in the horizontal direction, processing proceeds to branch ST2007. When slide manipulation is determined not to be performed, processing proceeds to step ST2005.

In branch ST2007, the bookmark determination section 515 determines whether or not there is a bookmark in the object appearing on the display section 503. The object on the display section 503 also includes a virtual continuous extent outside the display screen. When there is a bookmark in the object on the display section 503 (YES), processing proceeds to branch ST2009. In contrast, when there is not any bookmark in the object on the display section 503 (NO), processing proceeds to step ST2005.

In branch ST2009, the bookmark determination section 515 determines the number of bookmarks in the objects of the display section 503. When the number of bookmarks is one, processing proceeds to step ST2101 shown in FIG. 21. When the number of bookmarks is two, processing proceeds to branch ST2201 shown in FIG. 22. When the number of bookmarks is three or more, processing proceeds to branch ST2301 shown in FIG. 23.

In step ST2005, flicking manipulation does not straddle the fiducial line, the scroll control unit 511 causes the display section 503 to perform an inertial scroll that originates from flicking manipulation. Processing flow pertaining to high speed scroll manipulation ends.

(Horizontal Slide, Jump Function)

Figure 21:
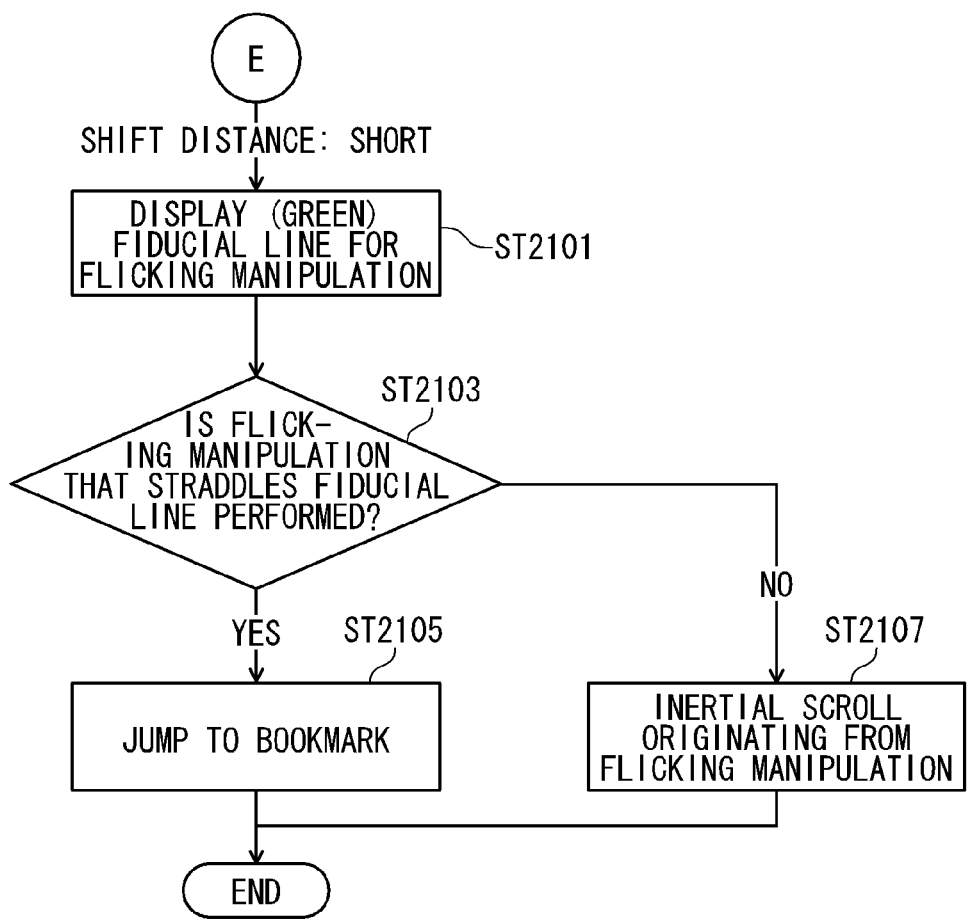
FIG. 21 is a diagram (2) for explaining an operation flow of the cellar phone 500 pertaining to the high speed inertial scroll manipulation.

FIG. 21 is a diagram (2) showing an operation flow of the cellular phone 500 pertaining to high speed scroll manipulation. When the bookmark determination section 515 determines the number of bookmarks in the object on the display section 503 as one in branch ST2009 shown in FIG. 20, operation flow of the cellular phone 500 goes to step ST2101 shown in FIG. 21.

In step ST2101, the jumping control unit 517 displays the fiducial line L5 for flicking manipulation in the display section 503. Processing then proceeds to branch ST2103. In step ST2101, one line or a thin line can also be displayed in the display section 503 as the fiducial line L5 for flicking manipulation.

In branch ST2103, the touch determination section 513 detects whether or not the flicking manipulation straddles the fiducial line L5. When the flicking manipulation straddles the fiducial line L5 (Yes), processing proceeds to step ST2105. In contrast, when the flicking manipulation does not straddle the fiducial line L5 (No), processing proceeds to step ST2107.

In step ST2105, the jumping control unit 517 causes the object on the display section 503 to jump to a position of a bookmark situated at the nearest position (the first bookmark) according to a (short) shift distance of the slide manipulation. A processing flow pertaining to high speed scroll manipulation thus ends.

In step ST2107, since flicking manipulation does not straddle the fiducial line L5, the scroll control unit 511 causes the display section 503 to perform inertial scroll that originates from the flicking manipulation. The processing flow pertaining to high speed scroll manipulation ends.

Figure 22:
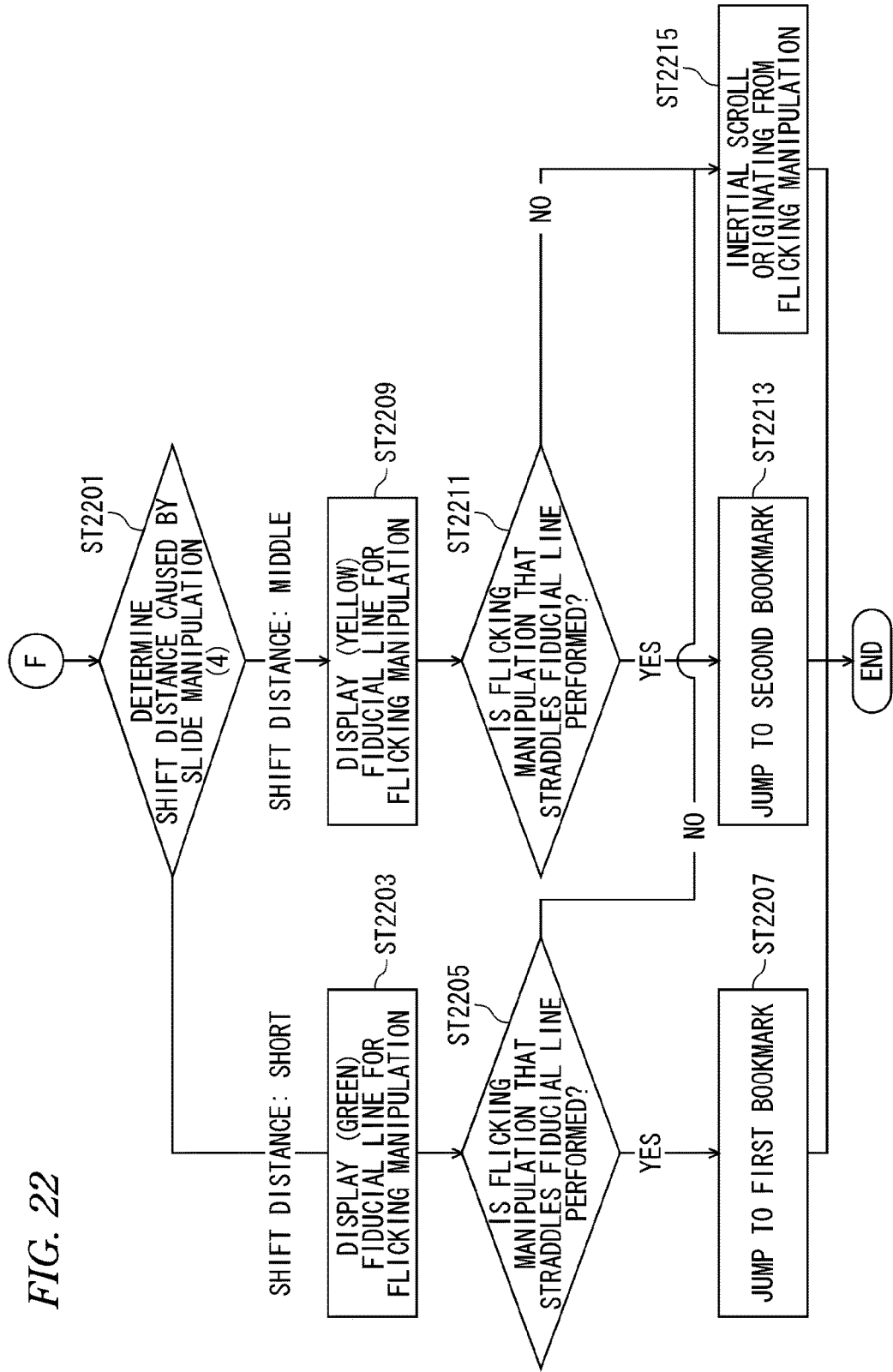
FIG. 22 is a diagram (3) for explaining an operation flow of the cellar phone 500 pertaining to the high speed inertial scroll manipulation.

FIG. 22 is a diagram (3) showing an operation flow of the cellular phone 500 pertaining to high speed scroll manipulation. When the bookmark determination section 515 determines the number of bookmarks in the object on the display section 503 as two in branch ST2009 shown in FIG. 20, the operation flow of the cellular phone 500 goes to branch ST2201 shown in FIG. 22 ("Determination 4 of a distance of shift caused by slide manipulation").

In branch ST2201, the touch determination section 513 determines slide manipulation and a shift direction and a shift distance of the slide manipulation as user's touch panel input manipulation. When the user's touch panel input manipulation is slide manipulation and when a shift distance caused by the slide manipulation is short, processing proceeds to step ST2203. In contrast, when the user's touch panel input manipulation is slide manipulation and when the shift distance caused by the slide manipulation is intermediate, processing proceeds to step ST2209.

In step ST2203, the jumping control unit 517 displays the fiducial line L5 for flicking manipulation in the display section 503. Processing proceeds to branch ST2206. Alternatively, in step ST2203, one line or a thin line can also be displayed as the fiducial line L5 for flicking manipulation in the display section 503.

In branch ST2206, the touch determination section 513 detects whether or not flicking manipulation straddles the fiducial line L5. When the flicking manipulation straddles the fiducial line L5 (Yes), processing proceeds to step ST2207. In contrast, when the flicking manipulation does not straddle the fiducial line L5 (No), processing proceeds to step ST2215.

In step ST2207, the jumping control unit 517 causes the object on the display section 503 to jump to the position of the bookmark situated at the nearest position (the first bookmark) according to the (short) shift distance of the slide manipulation. The processing flow pertaining to high speed scroll manipulation thus ends.

In step ST2209, the jumping control unit 517 displays the fiducial line L5 for flicking manipulation in the display section 503. Processing proceeds to branch ST2211. Alternatively, in step ST2209, one line or a thin line can also be displayed as the fiducial line L5 for flicking manipulation in the display section 503.

In branch ST2211, the touch determination section 513 detects whether or not flicking manipulation straddles the fiducial line L5. When the flicking manipulation straddles the fiducial line L5 (Yes), processing proceeds to step ST2213. In contrast, when the flicking manipulation does not straddle the fiducial line L5 (No), processing proceeds to step ST2215.

In step ST2213, the jumping control unit 517 causes the object on the display section 503 to jump to a position of a bookmark situated at the second nearest position (i.e., the second bookmark) according to a (middle) shift distance of the slide manipulation. The processing flow pertaining to high speed scroll manipulation thus ends.

In step ST2215, since flicking manipulation does not straddle the fiducial line, the jumping control unit 517 causes the display section 503 to perform inertial scroll that originates from the flicking manipulation. The processing flow pertaining to high speed scroll manipulation ends.

Figure 23:
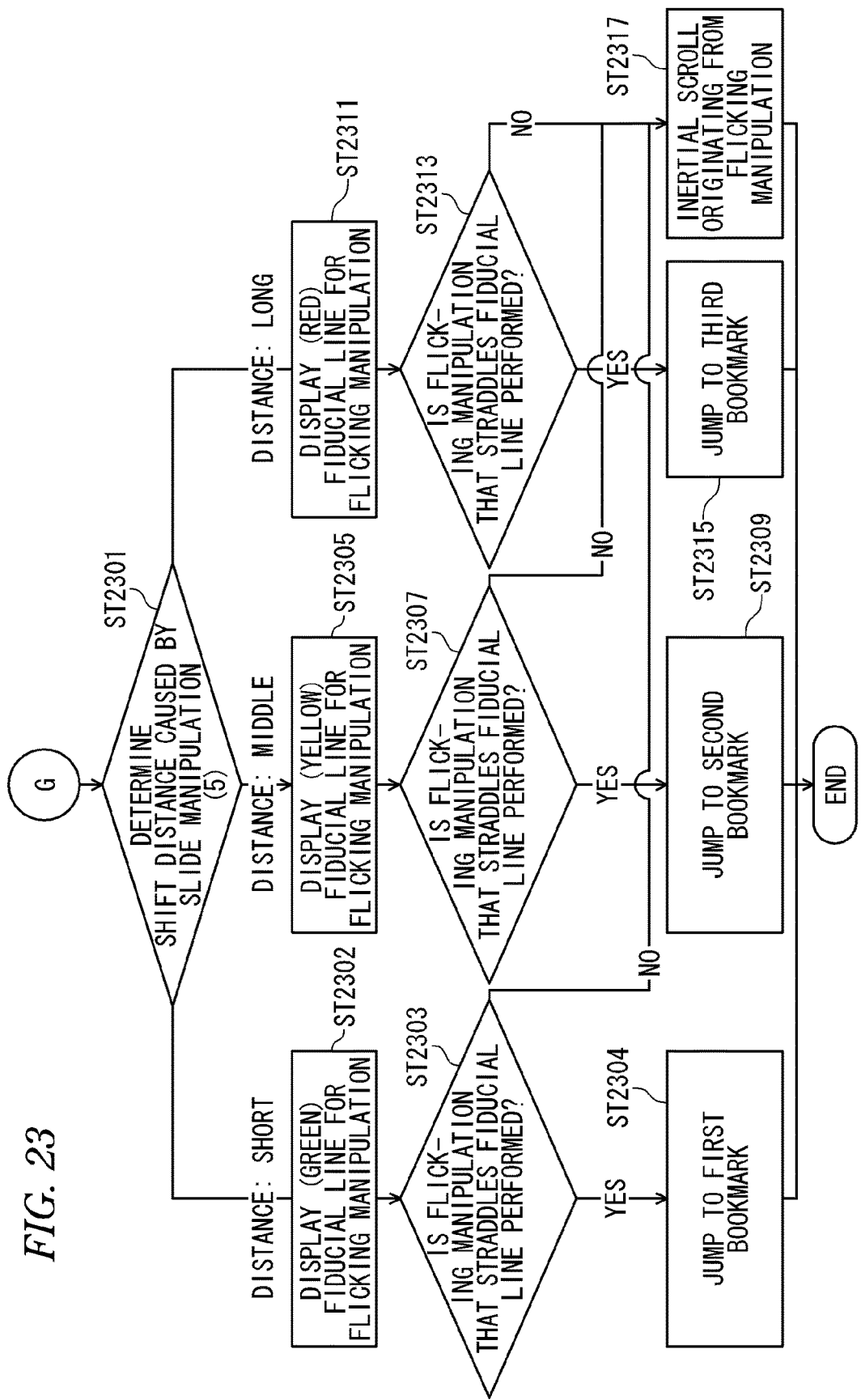
FIG. 23 is a diagram (4) for explaining an operation flow of the cellar phone 500 pertaining to the high speed inertial scroll manipulation.

FIG. 23 is a diagram (4) showing an operation flow of the cellular phone 500 pertaining to high speed scroll manipulation. When the bookmark determination section 515 determines the number of bookmarks in the objects of the display section 503 as three or more in branch S2009 shown in FIG. 20, the operation flow of the cellular phone 500 goes to branch ST2301 shown in FIG. 23 ("Determination 5 of a distance of shift caused by slide manipulation").

In branch ST2301, the touch determination section 513 determines slide manipulation and a shift direction and a shift distance of the slide manipulation as user's touch panel input manipulation. When the user's touch panel input manipulation is slide manipulation and when a shift distance caused by the slide manipulation is short, processing proceeds to step ST2302. In contrast, when the user's touch panel input manipulation is slide manipulation and when the shift distance caused by the slide manipulation is intermediate, processing proceeds to step ST2305. Moreover, when the user's touch panel input manipulation is slide manipulation and when the shift distance caused by the slide manipulation is long, processing proceeds to step ST2311.

In step ST2302, the jumping control unit 517 displays the fiducial line L5 for flicking manipulation in the display section 503. Processing proceeds to branch ST2303. Alternatively, in step ST2302, one line or a thin line can also be displayed as the fiducial line L5 for flicking manipulation in the display section 503.

In branch ST2303, the touch determination section 513 detects whether or not flicking manipulation straddles the fiducial line L5. When the flicking manipulation straddles the fiducial line L5 (Yes), processing proceeds to step ST2304. In contrast, when the flicking manipulation does not straddle the fiducial line L5 (No), processing proceeds to step S2317.

In step ST2304, the jumping control unit 517 causes the object on the display section 503 to jump to the position of the bookmark situated at the nearest position (the first bookmark) according to the (short) shift distance of the slide manipulation. The processing flow pertaining to high speed scroll manipulation thus ends.

In step ST2305, the jumping control unit 517 displays the (yellow) fiducial line L5 for flicking manipulation in the display section 503. Processing proceeds to branch ST2307. Alternatively, in step ST2305, two lines or a middle thick line can also be displayed on the display section 503 as the fiducial line L5 for flicking manipulation.

In branch ST2307, the touch determination section 513 detects whether or not flicking manipulation straddles the fiducial line L5. When the flicking manipulation straddles the fiducial line L5 (Yes), processing proceeds to step ST2309. In contrast, when the flicking manipulation does not straddle the fiducial line L5 (No), processing proceeds to step ST2317.

In step ST2307, the jumping control unit 517 causes the object on the display section 503 to jump to the position of the bookmark (the second bookmark) situated at the second nearest position according to the (middle) shift distance of the slide manipulation. The processing flow pertaining to high speed scroll manipulation thus ends.

In step ST2311, the jumping control unit 517 displays the (red) fiducial line L5 for flicking manipulation in the display section 503. Processing proceeds to branch ST2313. Alternatively, in step ST2322, three lines or a thick line can also be displayed on the display section 503 as the fiducial line L5 for flicking manipulation.

In branch ST2313, the touch determination section 513 detects whether or not flicking manipulation straddles the fiducial line L5. When the flicking manipulation straddles the fiducial line L5 (Yes), processing proceeds to step ST2315. In contrast, when the flicking manipulation does not straddle the fiducial line L5 (No), processing proceeds to step ST2317.

In step ST2315, the jumping control unit 517 causes the object on the display section 503 to jump to the position of the bookmark (the third bookmark) situated at the third nearest position according to the (long) shift distance of the slide manipulation. The processing flow pertaining to high speed scroll manipulation thus ends.

In step ST2317, since flicking manipulation does not straddle the fiducial line, the jumping control unit 517 causes the display section 503 to perform inertial scroll that originates from the flicking manipulation. The processing flow pertaining to high speed scroll manipulation ends.

(Vertical Slide, High Speed Inertial Scroll Function)

Figure 24:
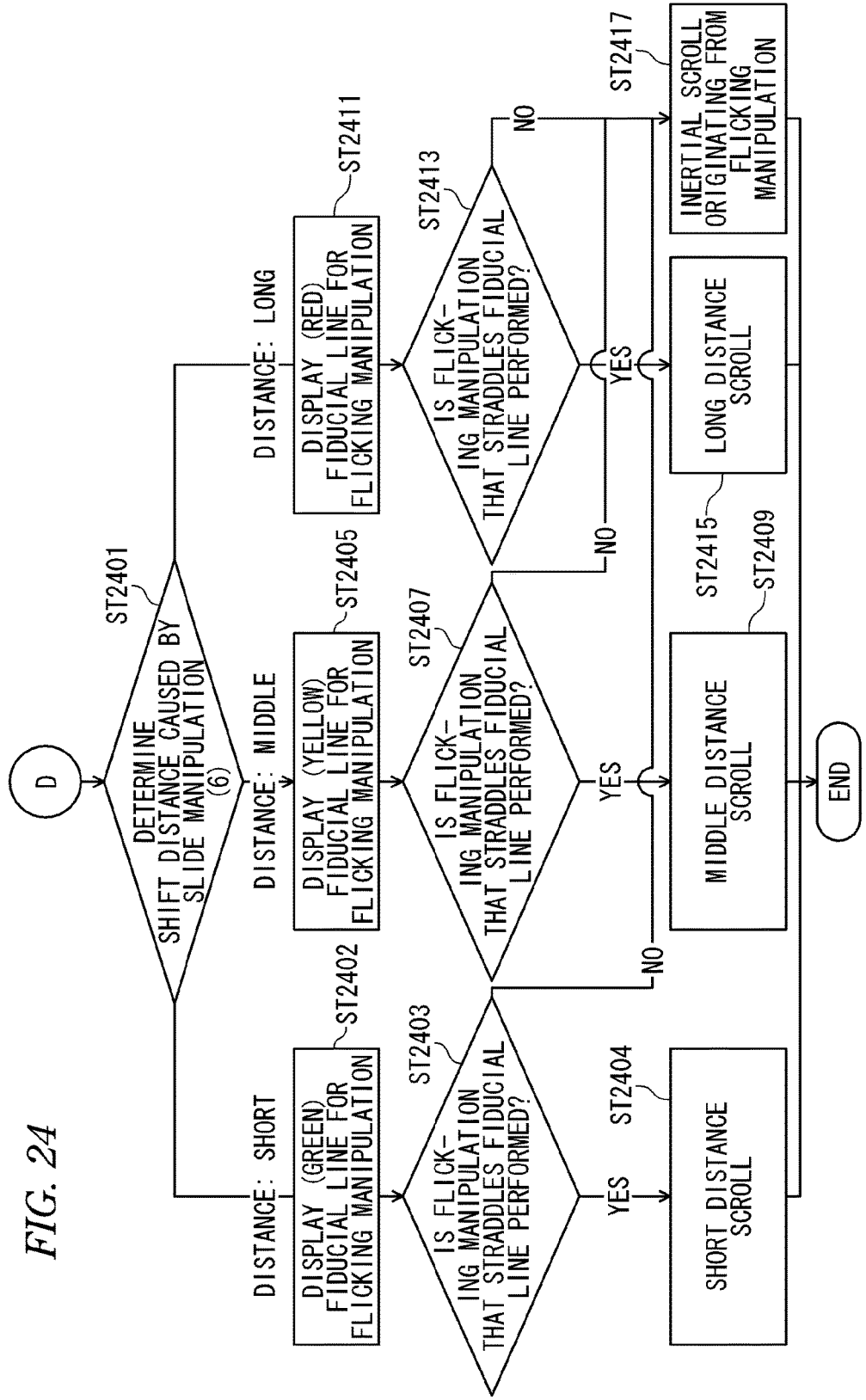
FIG. 24 is a diagram (5) for explaining an operation flow of the cellar phone 500 pertaining to the high speed inertial scroll manipulation.

FIG. 24 is a diagram (5) showing an operation flow of the cellular phone 500 pertaining to high speed scroll manipulation. When in branch ST2003 shown in FIG. 20 the touch determination section 513 determines that the vertical slide manipulation is performed, processing proceeds to branch ST2401 ("Determination 6 of shift distance caused by slide manipulation") shown in FIG. 24. In the case of vertical slide manipulation, the display section 503 performs a high speed inertial scroll according to an (small, middle, or large) amount of shift caused by slide manipulation.

In branch ST2401, the touch determination section 513 determines slide manipulation and a shift direction and a shift distance of the slide manipulation as user's touch panel input manipulation. When the user's touch panel input manipulation is slide manipulation and when a shift distance caused by the slide manipulation is short, processing proceeds to step ST2402. In contrast, when the user's touch panel input manipulation is slide manipulation and when the shift distance caused by the slide manipulation is intermediate, processing proceeds to step ST2405. Moreover, when the user's touch panel input manipulation is slide manipulation and when the shift distance caused by the slide manipulation is long, processing proceeds to step ST2411.

In step ST2402, the scroll control unit 511 displays the (green) fiducial line L5 for flicking manipulation in the display section 503. Processing proceeds to branch ST2403. Alternatively, in step ST2402, one line or a thin line can also be displayed as the fiducial line L5 for flicking manipulation in the display section 503.

In branch ST2403, the touch determination section 513 detects whether or not flicking manipulation straddles the fiducial line L5. When the flicking manipulation straddles the fiducial line L5 (Yes), processing proceeds to step ST2404. In contrast, when the flicking manipulation does not straddle the fiducial line L5 (No), processing proceeds to step S2417.

In step ST2404, the scroll control unit 511 performs high speed inertial scroll of the object on the display section 503 according to the (short) shift distance of the slide manipulation. Since the shift distance of the object caused by slide manipulation is short in this case, the shift distance of the object caused by the inertial scroll is short (i.e., a short distance scroll). The processing flow pertaining to high speed scroll manipulation thus ends.

In step ST2405, the scroll control unit 511 displays the (yellow) fiducial line L5 for flicking manipulation in the display section 503. Processing proceeds to branch ST2407. Alternatively, in step ST2405, two lines or a middle thick line can also be displayed on the display section 503 as the fiducial line L5 for flicking manipulation.

In branch ST2407, the touch determination section 513 detects whether or not flicking manipulation straddles the fiducial line L5. When the flicking manipulation straddles the fiducial line L5 (Yes), processing proceeds to step ST2409. In contrast, when the flicking manipulation does not straddle the fiducial line L5 (No), processing proceeds to step ST2417.

In step ST2409, the scroll control unit 511 performs high speed inertial scroll of the object on the display section 503 according to the (middle) shift distance of the slide manipulation. In this case, since the shift distance of the object caused by slide manipulation is intermediate, the shift distance of the object caused by the inertial scroll becomes intermediate (a middle distance scroll). The processing flow pertaining to high speed scroll manipulation thus ends.

In step ST2411, the scroll control unit 511 displays the (red) fiducial line L5 for flicking manipulation in the display section 503. Processing proceeds to branch ST2413. Alternatively, in step ST2411, two lines or a middle thick line can also be displayed on the display section 503 as the fiducial line L5 for flicking manipulation.

In branch ST2413, the touch determination section 513 detects whether or not flicking manipulation straddles the fiducial line L5. When the flicking manipulation straddles the fiducial line L5 (Yes), processing proceeds to step ST2415. In contrast, when the flicking manipulation does not straddle the fiducial line L5 (No), processing proceeds to step ST2417.

In step ST2415, the scroll control unit 511 performs high speed inertial scroll of the object on the display section 503 according to the (long) shift distance of the slide manipulation. In this case, the shift distance of the object caused by slide manipulation is long, the shift distance of the object caused by the inertial scroll becomes long (a long distance scroll). The processing flow pertaining to high speed scroll manipulation thus ends.

As above, the cellular phone 500 of the third embodiment can jump the object 550 of the display section 503 to the position of the marker (the bookmark 551) by means of (1) slide manipulation in the first direction (the direction designated by arrow A3) and the predetermined amount of flicking manipulation performed in the second direction (the direction designated by arrow B3) opposite to the first direction. Moreover, the cellular phone 500 of the third embodiment can perform high speed inertial scroll of the object 550 of the display section 503 by means of slide manipulation in the third direction (the direction designated by arrow C3) differing from the first and second directions and a predetermined amount of flicking manipulation in the fourth direction (the direction designated by arrow D3) that is opposite to the third direction. When compared with the first and second embodiments, the cellular phone 500 of the third embodiment can shift the object on the display section 503 faster to a desired position.

In the cellular phone 500 according to the embodiment, the fiducial line that serves as a fiducial for flicking manipulation in the horizontal direction is displayed in the display section 503. Accordingly, distinguishing between when the display section 503 is jumped to a predetermined position by an inertial scroll and when the display section 303 is shifted by means of an ordinary inertial scroll manipulation can be carried out by means of flicking manipulation that straddles the fiducial line and flicking manipulation that does not straddle the fiducial line. Likewise, the fiducial line that serves as a fiducial for flicking manipulation in the vertical direction is displayed in the display section 503. Accordingly, distinguishing between when the display section 303 is shifted at high speed to a predetermined position by an inertial scroll and when the display section 303 is shifted by means of an ordinary inertial scroll can be carried out by means of flicking manipulation that straddles the fiducial line and flicking manipulation that does not straddle the fiducial line.

The cellular phone 500 according to the embodiment can control the amount of shift originating from flicking manipulation according to the amount of shift originating from slide manipulation, by means of changing the method of displaying a fiducial line of flicking manipulation according to the amount of slide manipulation.

The respective functional blocks used for explanation of the respective embodiments are realized by an LSI that is typically an integrated circuit. The functional blocks can also be individually embodied as a single chip or embodied as a single chip so as to include some or all of the functional blocks. The integrated circuit is herein referred to as an LSI but sometimes called an IC, a system LSI, a super LSI, and an ultra LSI according to a degree of integration.

A technique for embodying an integrated circuit is also not restricted to the LSI, and the integrated circuit can also be actualized in the form of a custom-designed circuit or a general-purpose processor. After manufacture of an LSI, a programmable FPGA (Field Programmable Gate Array) or a reconfigurable processor that enables reconfiguration of connections and settings of circuit cells in the LSI can also be utilized.

Furthermore, as a matter of course, if there is the advent of a circuit integration technique that replaces the LSI with another technique resulting from advancement or derivation of the semiconductor technique, the functional blocks can also be integrated by use of the technique. Application of biotechnology, and like other techniques, is feasible.

Although the invention has been described in detail by reference to the specific embodiments, it is manifest to those skilled in the art that the invention be susceptible to various alterations or modifications without departing the spirit and scope of the invention.

The present application is based on Japanese Patent Application (No. 2010-151204) filed on Jul. 1, 2010, the contents of which are incorporated herein by reference in its entirety.

INDUSTRIAL APPLICABILITY

The electronic device, the method of controlling display, and the program of the invention yield an advantage of the ability to shift an object on a display section at high speed to a predetermined position without repeated scroll manipulation by means of slide manipulation or flicking manipulation and are useful for a cellular phone, and others.

REFERENCE SIGNS LIST 100, 300, 500: CELLULAR PHONE
101: TOUCH PANEL 103, 303, 503: DISPLAY SECTION
105: STORAGE (VRAM)
110, 310, 510: CONTROL UNIT
111, 511: SCROLL CONTROL UNIT
113, 313, 513: TOUCH DETERMINATION SECTION
311, 517: JUMPING CONTROL UNIT
315, 515: BOOKMARK DETERMINATION SECTION
351: FIDUCIAL BAR
L1, L2, L3, L4, L5, L6, L7, L8, L9, L10, L11: FIDUCIAL LINE

The invention claimed is:

1. An electronic device, comprising:
a display section that displays an object;
a touch panel that detects a touch input of an indicator;
a touch determination circuit that determines a manipulation instructed by the detected touch input; and
a scroll control circuit that performs, when a manipulation including a flicking of the indicator in a predetermined scrolling direction is determined to be instructed, scrolling the object in a direction corresponding to the predetermined scrolling direction, wherein,
when a special scrolling manipulation is determined to be instructed, the scrolling in the direction corresponding to the predetermined scrolling direction is performed faster and/or for a longer distance than when a normal scrolling manipulation is determined to be instructed,
the special scrolling manipulation is a flicking of the indicator in the predetermined scrolling direction for a flicking distance to a first threshold following a sliding of the indicator in a direction opposite to the predetermined scrolling direction for a sliding distance longer than a second predetermined threshold, during the sliding of the indicator in the direction opposite to the predetermined scrolling direction the object scrolls in the direction opposite to the direction corresponding to the predetermined scrolling direction, the flicking distance to the first threshold having a length less than the sliding distance longer than the second predetermined threshold, and
the normal scrolling manipulation is a flicking of the indicator in the predetermined scrolling direction without following a sliding of the indicator in the direction opposite to the predetermined scrolling direction for the sliding distance longer than the second predetermined threshold.

2. The electronic device according to claim 1, comprising a storage for temporarily storing the display information about the object, wherein
the display section displays the object temporarily stored in the storage.

3. The electronic device according to claim 1, wherein the scroll control circuit changes, when the special scrolling manipulation is determined to be instructed, the speed and/or distance of the scrolling according to the distance of the sliding performed before the flicking.

4. The electronic device according to claim 1, wherein the display section displays a fiducial object indicating the first threshold, and
the touch determination circuit determines the special scrolling manipulation is instructed when the sliding of the indicator is followed by the flicking which straddles the fiducial object.

5. The electronic device according to claim 4, wherein the display section displays a plurality of fiducial objects, each of which indicates a different predetermined threshold, and the scroll control circuit changes the speed and/or distance of the scrolling according to which of the plurality of the fiducial objects is straddled during the flicking of the indicator after the sliding of the indicator.

6. The electronic device according to claim 1, further comprising:
a jumping control circuit that performs jumping to a predetermined position when a jumping manipulation is determined to be instructed,
wherein the jumping manipulation is a flicking of the indicator in a jumping direction following a sliding of the indicator in a direction opposite to the jumping direction for a distance longer than a predetermined threshold.

7. The electronic device according to claim 6, wherein the jumping control circuit changes, when the jumping manipulation is determined to be instructed, the amount of jumping according to a distance of the sliding performed before the flicking.

8. A method of controlling a display, comprising the steps of:
detecting a touch input of an indicator by a touch panel;
displaying an object on a display section;
determining a manipulation instructed by the detected touch input;
performing, when a manipulation including a flicking of the indicator in a predetermined scrolling direction is determined to be instructed, scrolling the object in a direction corresponding to the predetermined scrolling direction, wherein,
when a special scrolling manipulation is determined to be instructed, the scrolling in the direction corresponding to the predetermined scrolling direction is performed faster and/or for a longer distance than when a normal scrolling manipulation is determined to be instructed,
the special scrolling manipulation is a flicking of the indicator in the predetermined scrolling direction for a flicking distance to a first threshold following a sliding of the indicator in a direction opposite to the predetermined scrolling direction for a sliding distance longer than a second predetermined threshold, during the sliding of the indicator in the direction opposite to the predetermined direction the object scrolls in the direction opposite to the direction corresponding to the predetermined direction, the flicking distance to the first threshold having a length less than the sliding distance longer than the second predetermined threshold, and
the normal scrolling manipulation is a flicking of the indicator in the predetermined scrolling direction without following a sliding of the indicator in the direction opposite to the predetermined scrolling direction for the sliding distance longer than the second predetermined threshold.

9. A non-transitory computer-readable storage medium in which is stored a program for causing a computer to execute the steps of:
detecting a touch input of an indicator by a touch panel;
displaying an object on a display section;
determining a manipulation instructed by the detected touch input;
performing, when a manipulation including a flicking of the indicator in a predetermined scrolling direction is determined to be instructed, scrolling the object in a direction corresponding to the predetermined scrolling direction, wherein,
when a special scrolling manipulation is determined to be instructed, the scrolling in the direction corresponding to the predetermined scrolling direction is performed faster and/or for a longer distance than when a normal scrolling manipulation is determined to be instructed, the special scrolling manipulation is a flicking of the indicator in the predetermined scrolling direction to a first threshold following a sliding of the indicator in a direction opposite to the predetermined scrolling direction for a sliding distance longer than a second predetermined threshold, during the sliding of the indicator in the direction opposite to the predetermined scrolling direction, the object scrolls in the direction opposite to the direction corresponding to the predetermined scrolling direction, the flicking distance to the first threshold having a length less than the sliding distance longer than the second predetermined threshold, and the normal scrolling manipulation is a flicking of the indicator in the predetermined scrolling direction without following a sliding of the indicator in the direction opposite to the predetermined scrolling direction for the sliding distance longer than the second predetermined threshold.

10. The electronic device according to claim 6, wherein, the jumping direction is the same as the predetermined scrolling direction, and the touch determination section distinguishes the special scrolling manipulation and the jumping manipulation according to whether the sliding of the indicator followed by the flicking of the indicator is performed on a specific object.

11. The electronic device according to claim 10, wherein, the specific object is a scroll bar, and the touch determination section determines the jumping manipulation is instructed when the sliding of the indicator followed by the flicking of the indicator is performed on the scroll bar.

12. The electronic device according to claim 6, wherein, the jumping direction is different from both the predetermined scrolling direction and the opposite direction to the predetermined scrolling direction.

13. The electronic device according to claim 1, wherein the indicator is a finger.

14. The electronic device of claim 1, wherein during the special scrolling manipulation, the indicator remains in contact with the touch panel until an end of the flicking of the indicator.

* * * * *